United States Patent
Furuya et al.

(10) Patent No.: US 7,440,658 B2
(45) Date of Patent: Oct. 21, 2008

(54) PHOTONIC CRYSTAL COUPLING DEFECT WAVEGUIDE

(75) Inventors: Katsumi Furuya, Ibaraki (JP); Kazuhiro Komori, Ibaraki (JP); Noritsugu Yamamoto, Ibaraki (JP); Yoshinori Watanabe, Ibaraki (JP)

(73) Assignees: Japan Science and Technology Agency, Saitama (JP); National Institute of Advanced Industrial Science and Technology, Tokyo (JP)

( * ) Notice: Subject to any disclaimer, the term of this patent is extended or adjusted under 35 U.S.C. 154(b) by 0 days.

(21) Appl. No.: 10/591,471

(22) PCT Filed: Mar. 1, 2005

(86) PCT No.: PCT/JP2005/003366

§ 371 (c)(1), (2), (4) Date: May 21, 2007

(87) PCT Pub. No.: WO2005/085921

PCT Pub. Date: Sep. 15, 2005

(65) Prior Publication Data

US 2007/0280592 A1 Dec. 6, 2007

(30) Foreign Application Priority Data

Mar. 3, 2004 (JP) ............................. 2004-058536

(51) Int. Cl.
*G02B 6/42* (2006.01)

(52) U.S. Cl. ....................................................... 385/39

(58) Field of Classification Search ................. 385/27, 385/4, 16, 39, 40, 123, 124, 125, 129, 130
See application file for complete search history.

(56) References Cited

U.S. PATENT DOCUMENTS

| 5,999,308 | A  | * | 12/1999 | Nelson et al. | ............... | 359/321 |
| 6,643,439 | B2 | * | 11/2003 | Notomi et al. | .............. | 385/125 |
| 6,738,551 | B2 | * | 5/2004  | Noda et al.   | .................. | 385/130 |
| 2001/0026668 | A1 | * | 10/2001 | Yamada        | ....................... | 385/125 |
| 2002/0146196 | A1 | * | 10/2002 | Shirane et al. | ................ | 385/16  |

FOREIGN PATENT DOCUMENTS

JP     2001-072414 A     3/2001

(Continued)

OTHER PUBLICATIONS

English language machine translation of JP 2003-295143-A, printed May 27, 2008.*

(Continued)

*Primary Examiner*—Quyen P Leung
(74) *Attorney, Agent, or Firm*—Rader, Fishman & Grauer, PLLC

(57) ABSTRACT

A photonic crystal directional coupler composed of at least two linear defect waveguides introduced into a photonic crystal. The medium constant and the lattice constant of the photonic crystal at the photonic crystal directional coupling part, the sizes and shapes of the elements constituting the periodical structure of the photonic crystal are varied. Thereby the difference in propagation constant between the even and odd modes of the photonic crystal directional coupling part is increased, thus shortening the coupling length of the photonic crystal directional coupler.

1 Claim, 23 Drawing Sheets

FOREIGN PATENT DOCUMENTS

| | | | |
|---|---|---|---|
| JP | 2001-249235 A | 9/2001 | |
| JP | 2001-281480 A | 10/2001 | |
| JP | 2001-518707 A | 10/2001 | |
| JP | 2002-169048 A | 6/2002 | |
| JP | 2002-196296 A | 7/2002 | |
| JP | 2002-277659 A | 9/2002 | |
| JP | 2002-303836 A | 10/2002 | |
| JP | 2003-043273 A | 2/2003 | |
| JP | 2003-156642 A | 5/2003 | |
| JP | 2003-215367 A | 7/2003 | |
| JP | 2003-295143 A | 10/2003 | |
| JP | 2004-004419 A | 1/2004 | |
| JP | 2004-045709 A | 2/2004 | |
| WO | WO-99/17349 A | 4/1999 | |

OTHER PUBLICATIONS

Office Action mailed on Nov. 13, 2007 (Japan).
A. Martinez, et al., "Ultrashort 2-D Photonic Crystal Directional Couplers", IEEE Photonics Technology Letters, vol. 15, No. 5 pp. 694-696 (May, 2003).
Morten Thorhauge, et al., "Efficient photonic crystal directional couplers", Optics Letters, vol. 28, No. 17, pp. 1525-1527 (Sep. 1, 2003).
Katsumi Furuya et al., "Design of small optical switch with 4-port directional coupler in two-dimensional photonic crystal slab", Photonic Research Institute, National Institute of Advanced Industrial Science and Technology (AIST), p. 203.
Katsumi Furuya et al., "Theoretical study for shortening optical switch with 4-port directional coupler in 2-D photonic crystal slab", The 51st Japan Society of Applied Physics Academic Lecture Materials, p. 1165, (Mar. 2004).
Noritsugu Yamamoto et al., "Photonic crystal waveguide directional coupler with short coupling length and high extinction ratio", The Institute of Electronics, Information and Communication Engineers, Technical Report of IEICE, pp. 67-70 (Jul. 2004).
Stefano Boscolo et al., "Coupling and Decoupling of Electromagnetic Waves in Parallel 2-D Photonic Crystal Waveguides", IEEE Journal of Quantum Electronics vol. 38, No. 1, pp. 47-53, (Jan. 2002).
M. Tokushima et al., "Photonic crystal line defect waveguide directional coupler", Electronics Letters, vol. 37, No. 24, pp. 1454-1455 (Nov. 2001).
J. Zimmermann et al, "Photonic crystal waveguide directional couplers as wavelength selective optical filters", Optics Communications 230, pp. 387-392 (Feb. 2004).
"Recent progress and future prospects of photonic crystal research—Revised Edition—Toward a technology roadmap (Photonic crystal breakthrough technology forum)", Optoelectronic Industry and Technology Development Association, 14-013-1, pp. 34-36 (Mar. 2002).
H. Yamada, "Theoretical analysis of photonic crystal directional coupler based optical switches", Institute of Electronics, Information and Communication Engineers Electronics Society Conference, C-4-7, pp. 249 (2002).
K. Tajima, "All-Optical Switch with Switch-Off Time Unrestricted by Carrier Lifetime", Jpn. J. Appl. Phys. vol. 32 Part 2 No. 12A, pp. L1746-L1749 (Dec. 1, 1993).
K. Kishioka, "Characteristics of the Optical Resonator Composed of the Nonlinear Directional Coupler", IEEJ Trans. FM., vol. 123, No. 12 (2003).
M. Tokushima et al., "Photonic crystal line defect waveguide directional coupler", Electronics Letters, vol. 37, No. 24, pp. 1454-1455 (Nov. 22, 2001).
H. Benisty et al., "Models and Measurement for the Transmission of Submicron-Width Waveguide Bends Defined in Two-Dimensional Photonic Crystals", IEEE Journal of Quantum Electronics, vol. 38, No. 7, pp. 770-785 (Jul. 2002).
J. Moosburger et al., "Enhanced transmission through photonic-crystal based bent waveguides by bend of engineering", Applied Physics Letters, vol. 79, No. 22, pp. 3579-3581 (Nov. 26, 2001).
A. Talneau et al., "Photonic-crystal ultrashort bends with improved transmission and low reflection at 1.55µm", Applied Physics Letters, vol. 80, No. 4, pp. 547-549 (Jan. 28, 2002).
Noritsugu Yamamoto et al., "Photonic crystal directional coupler with short coupling length and high extinction ratio", The 65th Japan Society of Applied Physics Academic Lecture Materials, p. 936, Tohoku Gakuin University (Sep. 2004).
Toru Ogawa et al., "Photonic crystal directional coupler switch with short switching length and wide band width", The 65th Japan Society of Applied Physics Academic Lecture Materials, p. 936, Tohoku Gakuin University (Sep. 2004).
Daisuke Mori et al., "Dispersion-Controlled Group Delay Device by Index-Chirped Photonic Crystal Waveguide Directional Coupler", The 51st Japan Society of Applied Physics Academic Lecture Materials, p. 1147, Tohoku Gakuin University (Mar. 2004).
International Preliminary Report mailed on Dec. 7, 2006.
International Search Report mailed Jul. 5, 2005.
International Preliminary Report mailed on Sep. 14, 2006.

* cited by examiner

PHOTONIC CRYSTAL COUPLING DEFECT WAVEGUIDE

TECHNICAL FIELD

The present invention relates to a photonic crystal coupling defect waveguide and a photonic crystal device, and particularly to a photonic crystal coupling defect waveguide in which coupling of electromagnetic waves propagating through plural defects in a two-dimensional or three-dimensional photonic crystal is realized in a small range in space so as to shorten the coupling length, and a photonic crystal device using the same for light/electromagnetic wave transmission, such as a directional coupler (divider/branching unit, coupler), a multiplexing combiner, a demultiplexer, a resonator, a modulator, a filter or a switch.

BACKGROUND ART

The background art will be described below while mentioning documents.

Undermentioned non-patent document 1 summarizes the trend of domestic and international photonic crystal research, and introduces, relatively in detail, the results of various research facilities (enterprise, university, national research institute, etc.) from the theoretical background to the design technique, specific manufacturing methods, and from materials to the application of devices and the like.

Besides, hitherto, examples in which design and manufacture have been made on a switch, a resonator, and a filter using mode coupling of plural waveguide will be described below.

Undermentioned non-patent document 2 describes a typical branched type interferometer structure (Mach-Zehnder type) optical switch device using a photonic crystal structure. With respect to this, although there are many examples of trial manufacturing in other documents, the operation principle of this device is not a directional coupler type which the invention uses.

Undermentioned non-patent document 3 discloses simulation on an optical switch which is of a directional coupler type using mode coupling between two line defect waveguides formed in a hexagonal lattice photonic crystal and is operated by the applied external electric field. However, there is disclosed only a comparison with a conventional optical switch using a structure other than the photonic crystal, and there is no disclosure on a specific improvement plan and a design guidance concerning the reduction in coupling length of the optical switch using the photonic crystal structure. Besides, the use of nonlinearity by quantum dots or ion doping is not described, and an example of trial manufacturing is not found also in other documents.

Although undermentioned non-patent document 4 discloses that an optical resonator based on a directional coupler type operation principle can be realized, its structure does not use the photonic crystal. Non-patent document 5 discloses simulation on a directional coupler type filter using mode coupling between two line defect waveguides formed in a hexagonal lattice photonic crystal or on a demultiplexer. However, countermeasures for reduction in coupling length are not disclosed.

Further, undermentioned patent documents 1 to 4 disclose optical devices using photonic crystals. For example, patent document 1 discloses an optical switch device of a branched type interferometer structure having a photonic crystal structure as described in non-patent document 2. Besides, patent document 2 discloses an optical modulator device which can output an optical signal faithful to the waveform of an electric signal by a simple structure. Patent document 3 discloses an optical circuit in which three photonic crystals are arranged while crystal orientations are selected so as to obtain a parallel light flux, branching and bending, and the parallel light flux having a high degree of parallelization is obtained in a self waveguide manner. Patent document 4 discloses a photonic crystal optical waveguide as described in non-patent document 3 and a directional coupler device.

Besides, with respect to a method of forming a two-dimensional or three-dimensional defect structure in a photonic crystal, undermentioned patent document 5 discloses a photonic crystal in which a polymer relatively easy to process is used as a material in addition to a semiconductor. Besides, undermentioned patent document 6 discloses a photonic crystal formed of ceramic, and undermentioned patent document 7 discloses a method of filling a hole with another functional material having an amplification effect or the like. Further, as a forming method of a three-dimensional photonic crystal, various forming methods such as an autocloning method and a method for Wood-pile structure are known. In this point, for example, see patent documents 8 and 9, etc.

Patent document 1: JP-A-2002-303836
Patent document 2: JP-A-2002-196296
Patent document 3: JP-A-2002-169048
Patent document 4: JP-A-2001-281480
Patent document 5: JP-A-2003-43273
Patent document 6: JP-A-2001-72414
Patent document 7: JP-A-2002-277659
Patent document 8: JP-A-2001-249235
Patent document 9: JP-T-2001-518707

Non-patent document 1: "Present state of photonic crystal research and future outlook—revised edition—Aiming at technology road map—", OPTOELECTRONIC INDUSTRY AND TECHNOLOGY DEVELOPMENT ASSOCIATION (Photonic crystal breakthrough technology forum), March 2002 (Heisei 14), 14-013-1

Non-patent document 2: Kazuhito Tajima, "All-optical switch with switch-off time unrestricted by carrier lifetime", Japanese Journal of Applied Physics, Vol. 32, Part 2, No. 12, 1993, pp. L1746-1749

Non-patent document 3: Hirohito Yamada, "Theoretical analysis of photonic crystal directional coupler type optical switch", 2002, Electronics Society Conference of the Institute of Electronics, Information and Communication Engineers, C-4-7

Non-patent document 4: Kiyoshi Kishioka, "Characteristics of optical resonator composed of the nonlinear directional coupler", Transactions of the Institute of Electrical Engineers of Japan, A, vol. 123, No. 12, 2003, p. 1166-1173

Non-patent document 5: J. Zimmermann, M. Kamp, A. Forchel, R. Marz, "Photonic crystal waveguide directional couplers as wavelength selective optical filters", Optics communications 230, 2004, pp. 387-392

DISCLOSURE OF THE INVENTION

Problems to Be Solved

However, in the conventional optical dielectric waveguide, since a large change can not be applied to a waveguide and its adjacent structure, when a distance between, for example, two mode-coupled waveguides forming a pair is determined, a coupling length as a spatial distance required for the energy of an electromagnetic field to transfer from the one waveguide to the other waveguide is also determined at the same time, and the coupling length can not be changed to be shorter in the middle of the propagation. Accordingly, the degree of coupling must be adjusted by the distance between the waveguides. When a sharp bend is formed in the dielectric waveguide, however, the propagated electromagnetic wave is leaked into the outside, and therefore, in order to gradually decrease or increase the interval between the pair of waveguides, a long distance in the propagation direction is required.

Also in the directional coupler formed of a waveguide, since it is difficult to apply a flexible alteration to the structure, it is difficult to alter the coupling length in the middle of propagation. In a coaxial cable, in the first place, it is difficult to form the directional coupler. As a result, when the directional coupler which can be applied to an optical switch or another useful element (device) is realized by a conventional waveguide, a relatively long distance is required, and this becomes an obstacle to device design and manufacture in which it is desired to be as small as possible.

Hitherto, it is said that the property to cause anomalous group velocity (slope of a plot in a band structure view) is the highest merit of the photonic crystal. However, in most cases, the number of waveguides is one, and further, the improvement plan is not made while paying attention not to the anomalous group velocity but to the difference (coupling length) in propagation constant between the respective modes interfering with each other in the case of plural waveguides with the mode coupling. Besides, also with respect to a plan to use a two-dimensional photonic crystal waveguide in which a slab thickness itself is varied, there is no specific disclosure.

In view of the above, the invention has an object to shorten the coupling length, in the case where plural waveguides are mode coupled, as compared with coupling using a conventional waveguide or coupling only using a simple photonic crystal defect waveguide. Particularly, the invention has an object to shorten the coupling length by using a photonic crystal coupling defect waveguide and an alteration on the photonic crystal element and others.

The invention has an object to shorten and miniaturize a directional coupler (divider/branching unit, coupler) on a photonic crystal, and a photonic crystal coupling defect waveguide based thereon, such as a multiplexing combiner, a demultiplexer, a resonator, a modulator, a filter or a switch. Besides, the invention has an object to realize photonic crystal coupling defect devices monolithically in a higher-rank device structure requiring those as parts by forming plural defect structures in one photonic crystal structure.

Means to Solve the Problems

In order to shorten the coupling length of a photonic crystal coupling defect waveguide and a photonic crystal device, a photonic crystal structure is altered.

In a coupler or a divider/branching unit using a photonic crystal defect waveguide, since sharp bending of a line defect is possible, it is expected that the foregoing problems in the dielectric waveguide are solved. Besides, the photonic crystal coupling defect waveguide exists within a range in which periodic structure elements are uniformly distributed, and the specific distribution interval (lattice constant), sizes, and shapes of the elements are totally or locally changed independently on each other or at the same rate, so that the property of an electromagnetic wave propagating in the defect waveguide can be relatively easily changed. Accordingly, even after a pair of waveguides to be coupled are brought close to each other to the utmost, when such a change to the photonic crystal elements is realized along the propagation direction of the waveguide, the coupling length can be further shortened. A similar effect can be obtained by changing the material of the photonic crystal along the propagation direction of the waveguide, or by locally changing the positions of the photonic crystal elements, or by changing, in the case of a two-dimensional photonic crystal slab, the thickness of the slab.

According to the first solving means of this invention, there is provided a photonic crystal coupling defect waveguide comprising:

a photonic crystal including photonic crystal elements constituting a periodic structure and, for suppressing propagation of an electromagnetic field including light or a radio wave of a specific wavelength or in a specific frequency range; and a coupling waveguide including at least two waveguides, each of which includes a line defect that is a plurality of defects which are portions where the photonic crystal elements constituting the periodic structure of the photonic crystal are locally removed like line and form the waveguide in the photonic crystal, and an input end or an output end for inputting and/or outputting the electromagnetic field and, which are mode-coupled to each other and, in which an electromagnetic field inputted to one of the waveguides causes an electromagnetic field to be propagated to the other waveguide, wherein by one of or more than one of (1) effectively changing a medium constant including one of or more than one of a dielectric constant, a refractive index, a conductivity and a magnetic permeability of the photonic crystal, (2) effectively changing size or shape of the photonic crystal elements, and (3) changing a lattice constant indicating a periodic interval of the photonic crystal elements, (a) band structures of an even mode and an odd mode of the coupling waveguide are shifted with respect to a normalized frequency, or (b) the band structures of the even mode and the odd mode of the coupling waveguide are respectively changed at different degrees;

and by this, a difference in propagation constant between the even mode and the odd mode at a normalized frequency is made large, and a coupling length of a mode-coupled propagating electromagnetic wave propagating in the coupling waveguide is made short.

According to the second solving means of this invention, there is provided a photonic crystal device comprising:

said photonic crystal coupling defect waveguide, wherein when an electromagnetic field is inputted to one waveguide of the coupling waveguide, coupling occurs between waveguides constituting the coupling waveguide, the electromagnetic field is propagated to the other waveguide, and the electromagnetic field is outputted from one of or more than one of the waveguides, and the photonic crystal device performs as one of a directional coupler in electromagnetic wave transmission, a divider/branching unit, a coupler, a multiplexing combiner, a demultiplexer, a resonator, a filter and a switch.

Advantage

According to the invention, the coupling length in the case where plural waveguides are mode coupled can be shorten as compared with coupling using a conventional waveguide or coupling only using a simple photonic crystal defect waveguide. Particularly, according to the invention, the coupling length can be shorten by using a photonic crystal coupling defect waveguide and an alteration on the photonic crystal element and others.

According to the invention, a directional coupler (divider/branching unit, coupler) on a photonic crystal, and a photonic crystal coupling defect waveguide based thereon, such as a multiplexing combiner, a demultiplexer, a resonator, a modulator, a filter or a switch can be shorten and miniaturized. Besides, according to the invention, photonic crystal coupling defect devices can be realized monolithically in a higher-rank device structure requiring those as parts by forming plural defect structures in one photonic crystal structure.

EMBODIMENT OF THE INVENTION

Figure 1:
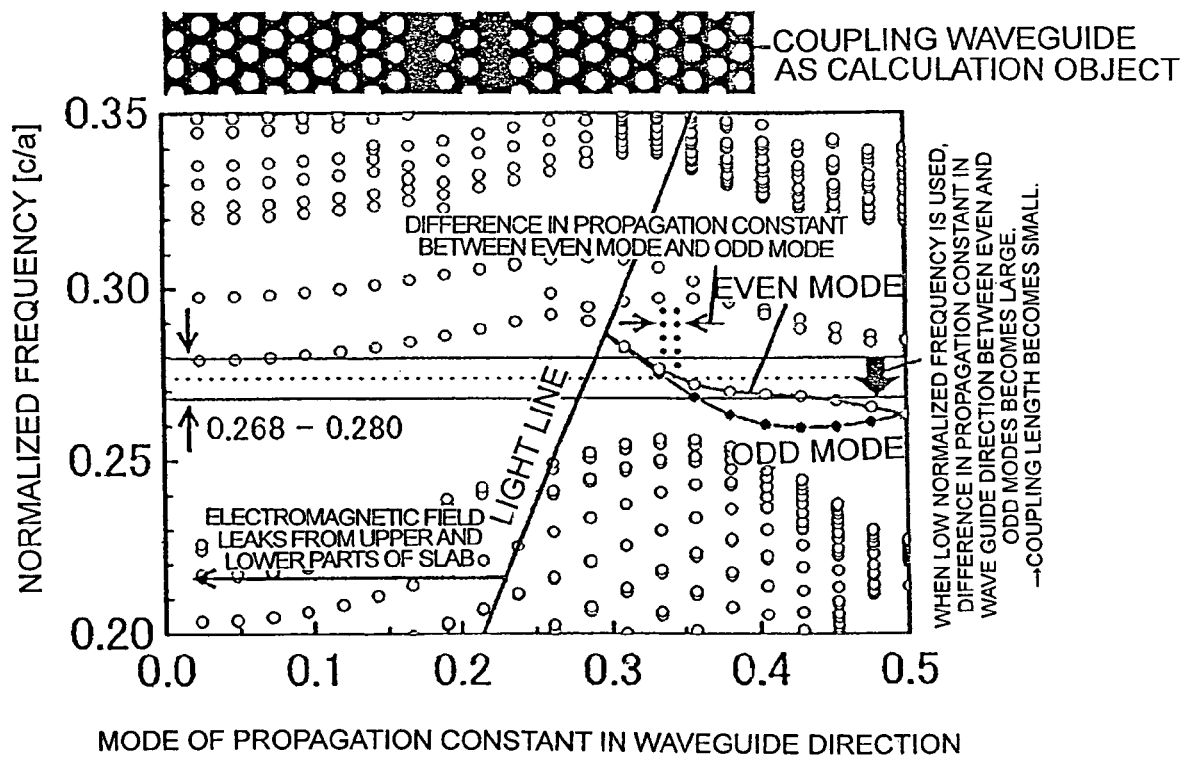
FIG. 1 is a schematic view of a photonic crystal coupling defect waveguide and its band structure view.

1. Explanation of Terms on Photonic Crystal

The "photonic crystal" is an artificial material in which a medium different from a certain medium in dielectric constant or conductivity is periodically arranged in the certain medium, and has a property to suppress the propagation of an electromagnetic field in a specific frequency range called a photonic band gap. For example, in a semiconductor plate (slab), as periodical structure "elements" (photonic crystal elements), for example, air holes with determined sizes are provided in the whole of the plate at determined intervals, that becomes the photonic crystal to realize the photonic band gap in the plane direction of the plate ("two-dimensional photonic crystal slab"). The photonic crystal can be regarded as a periodic structure designed so that an electromagnetic wave does not penetrate therein. The periodic interval is called "lattice constant". When the periodic structure is realized only in one direction, it is a "one-dimensional photonic crystal", and when realized only in a plane direction, it is a "two-dimensional photonic crystal". When there is a solid periodic structure, it is called a "three-dimensional photonic crystal". Among these, the one-dimensional photonic crystal is called also a multilayer film. Besides, in general, the square root of a dielectric constant expresses a refractive index.

As configurations to realize the photonic crystals, there are various ones according to the shapes of the periodic structural elements or the way of arrangement. With respect to the arrangement, in the two-dimensional photonic crystal, for example, a two-dimensional hexagonal lattice crystal, a two-dimensional triangular lattice crystal, or a two-dimensional tetragonal lattice crystal is often used. In the three-dimensional photonic crystal, for example, a three-dimensional face-centered cubic lattice crystal, a three-dimensional body-centered cubic lattice crystal, or a woodpile structure is often used. Besides, as a material for manufacture of the photonic crystal, for example, a metal conductor, a semiconductor, a synthetic resin, a polymer, or glass is often used, however, no limitation is made to this.

By partially removing ("defect") the periodic structure in the photonic crystal, the electromagnetic field oscillating at a frequency within the range of the photonic band gap in the photonic crystal exists locally in the defect portion, and can not be propagated to the photonic crystal therearound.

Further, when defects are continuously formed, the electromagnetic wave is propagated only along the range of the defects, the electromagnetic wave does not leak to the periphery, and they function as a "defect waveguide". The defect waveguide of the photonic crystal can be said to be a device for controlling the propagation direction of an electromagnetic wave similarly to a waveguide such as a "wave guide tube", a "coaxial cable", a "high refractive index waveguide (HIC:High Index Circuits)" or an "optical fiber". These waveguides localize the electromagnetic field only in the inside and does not leak or hardly leak the electromagnetic wave to the outside. Here, the "HIC" is such that a region of a medium relatively much different from a certain medium in refractive index is provided in the certain medium and the electromagnetic wave is confined therein to provide a function as a waveguide, and a silicon thin line waveguide has been realized for light.

The ratio of the lattice constant to the wavelength, in vacuum, of an electromagnetic wave propagating in a defect waveguide is called a "normalized frequency". The normalized frequency Nf can be expressed by a following expression.

$$Nf=a/\lambda \quad (1)$$

where, a: lattice constant [m], $\lambda$: wavelength [m] of input signal in free space.

With respect to a "point defect", in a photonic crystal, in the case where periodic structure elements constituting the photonic crystal are not continuous with other defects and only one is missing, the term indicates the missing portion. Besides, a "line defect" is a term indicating a portion where plural point defects are continuous or intermittent. In general, the defect waveguide in the photonic crystal is realized by this line defect ("line defect waveguide"). Incidentally, these terms are generally used in the field of the photonic crystal.

Figure 9:
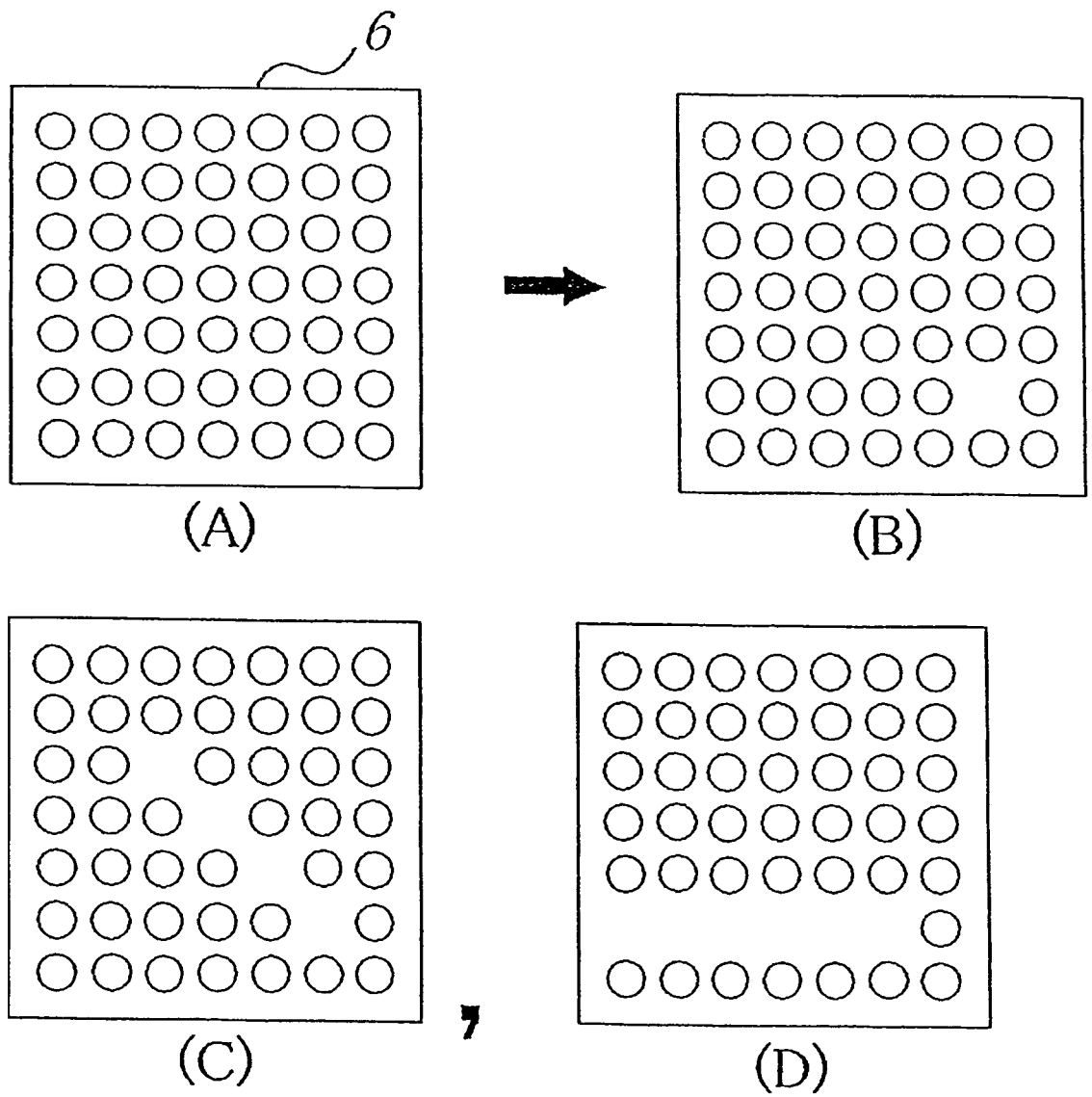
FIG. 9 is an explanatory view of a point defect and a line defect.

FIG. 9 is an explanatory view of a point defect and a line defect. This example indicates a case where air circular holes (O, elements realizing the periodic structure) are periodically (two-dimensional tetragonal lattice) in a photonic crystal 6 of a Si slab ( ) or the like. FIG. 9(A) shows a periodic structure without defects, and FIG. 9(B) shows that it has one "point defect" at the lower right. Besides, FIGS. 9(C) and 9(D) show examples of the line defect.

Figure 10:
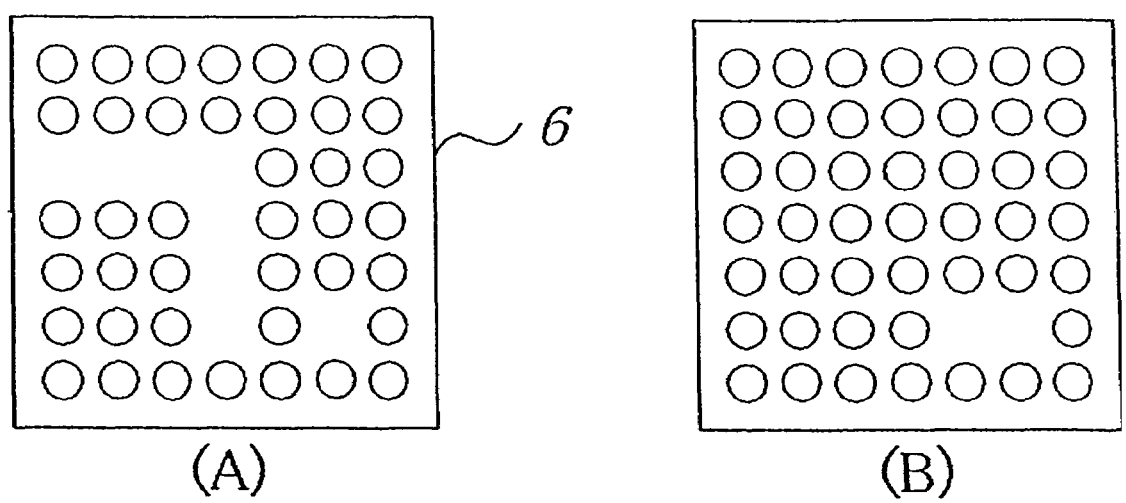
FIG. 10 is another explanatory view of a point defect and a line defect.

FIG. 10 is another explanatory view of the point defect and the line defect. FIG. 10(A) shows the line defect including a bend and the point defect, and FIG. 10(B) shows two continuous point defects or a short line defect with a length of two elements.

The "electromagnetic wave" is a spatial and temporal oscillation (especially often indicating a periodic oscillation) of an electromagnetic field as a phenomenon. In general, the electromagnetic wave moves energy in space while propagating. When a change in the value of an electromagnetic field (electric field and magnetic field) occurs in a place, the change is inevitably propagated to the surrounding electromagnetic field with time.

This is the propagation of an electromagnetic wave (so-called radio wave), and when the first change of the electromagnetic field is periodic (for example, sine vibration of 50 times per second), what is generated therearound at that time is an electromagnetic wave with the frequency (for example, 50 Hz). Incidentally, light is a kind of electromagnetic wave. In this connection, according to the radio law, since the "radio wave" is an electromagnetic wave of a frequency of 3 million megahertz or less, an electromagnetic wave of a frequency exceeding 3000000 MHz (3 THz) is light (infrared light etc.) or radioactive ray (X-ray etc.). The electromagnetic wave has various propagation modes depending on a transmission line or a propagation path. This is a propagation form of a guided wave characterized by a specific shape of an electromagnetic field.

Electric power movement from a propagation path to a specific mode in another propagation path is called "coupling". Besides, "coupling length" is a spatial distance required for energy of an electromagnetic field to transfer from one waveguide to the other waveguide. Incidentally, it sometimes indicates a distance required for 100% energy to transfer from one waveguide to the other waveguide. Besides, a change in phase per unit length along the propagation direction of an electromagnetic wave oscillating at a frequency is called "phase constant" or "wave number", and in the case where there is no loss in the propagation path, these are equivalent to "propagation constant".

2. Coupling Defect Waveguide in Photonic Crystal

Figure 11:
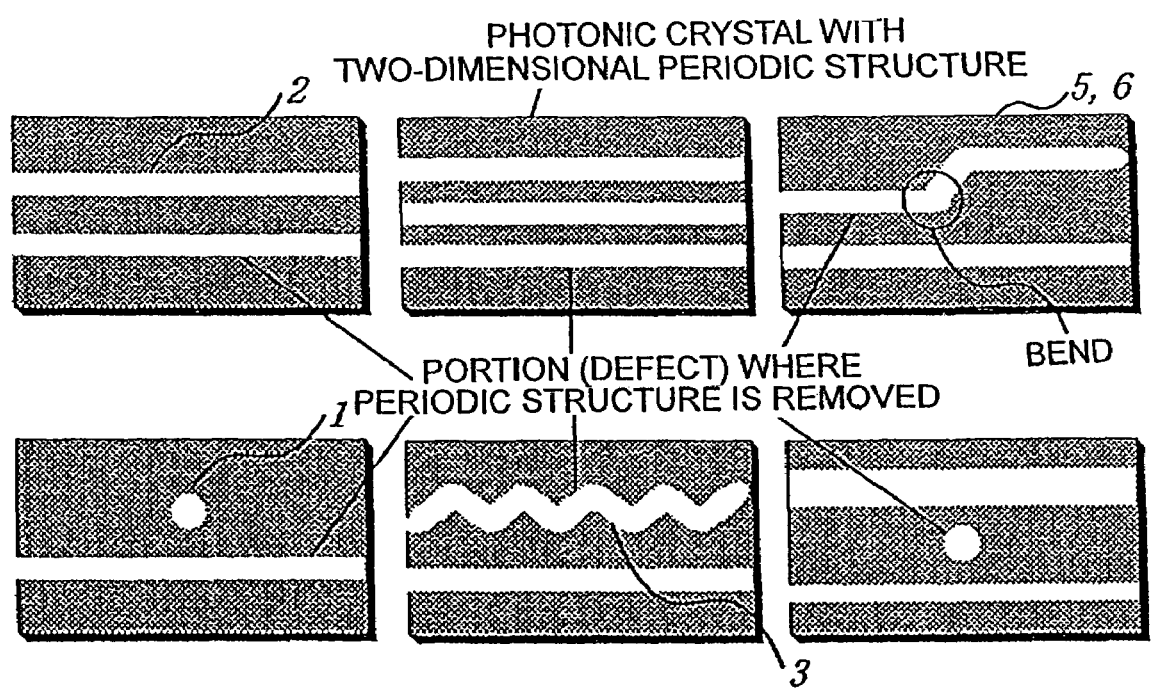
FIG. 11 is a schematic view of a two-dimensional photonic crystal coupling defect waveguide.
Figure 12:
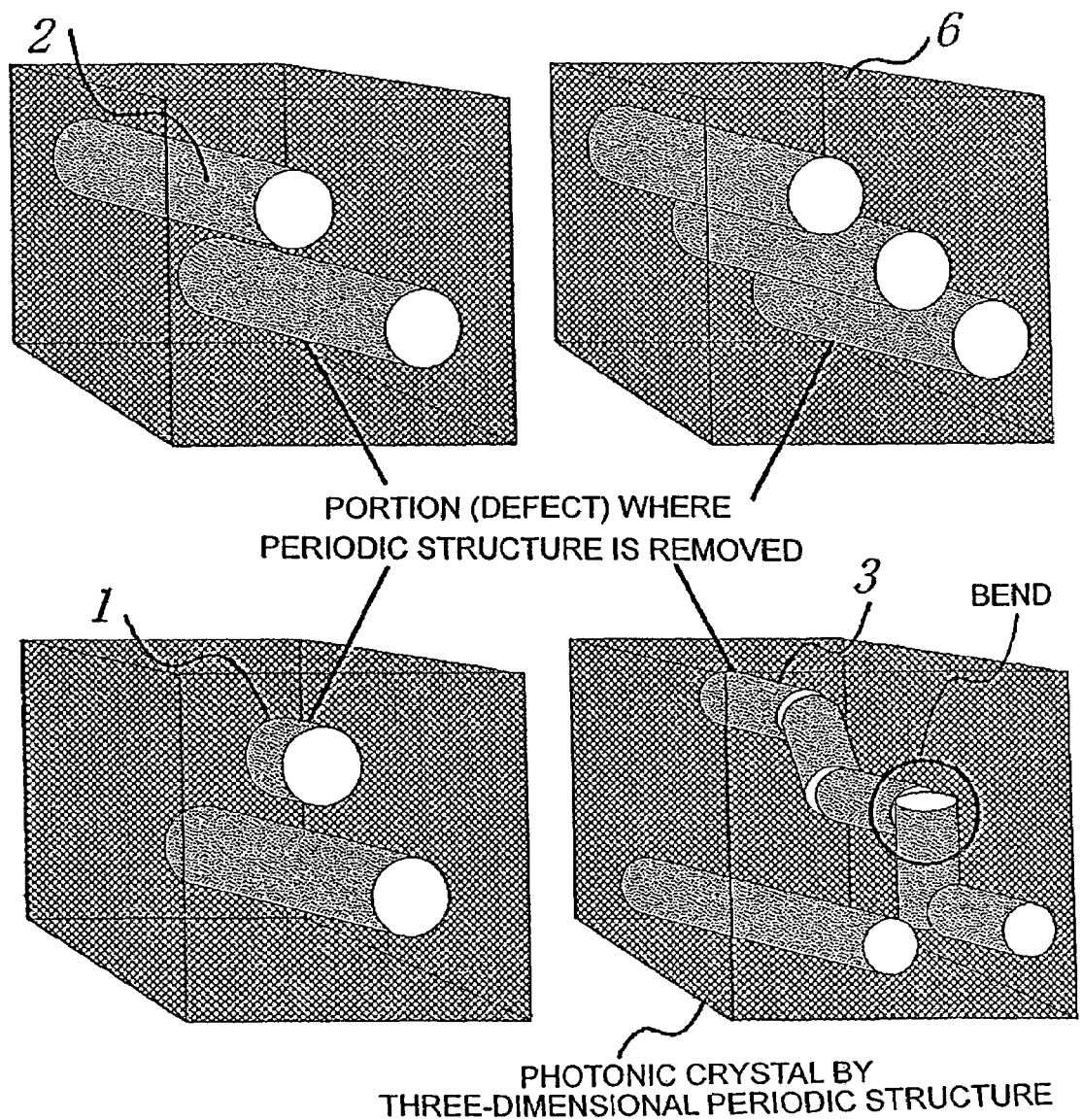
FIG. 12 is a schematic view of a three-dimensional photonic crystal coupling defect waveguide.

FIG. 11 is a schematic view of a photonic crystal coupling defect waveguide based on a two-dimensional periodic structure. FIG. 12 is a schematic view of a photonic crystal coupling defect waveguide based on a three-dimensional periodic structure. These drawings are schematic views of coupling waveguides including two-dimensional or three-dimensional plural point defects 1 or line defects 2 or line defect 3 having bends in a photonic crystal 6. This is used as one photonic crystal coupling defect waveguide in which the point defects 1 to localize the electromagnetic wave therein, the line defects 2 and 3 as waveguides to guide the electromagnetic wave are arranged to be close to each other in various combinations and are coupled. Here, the number of a set of defects to be coupled may be three or more. Besides, the line defects may have various thicknesses.

Figure 13:
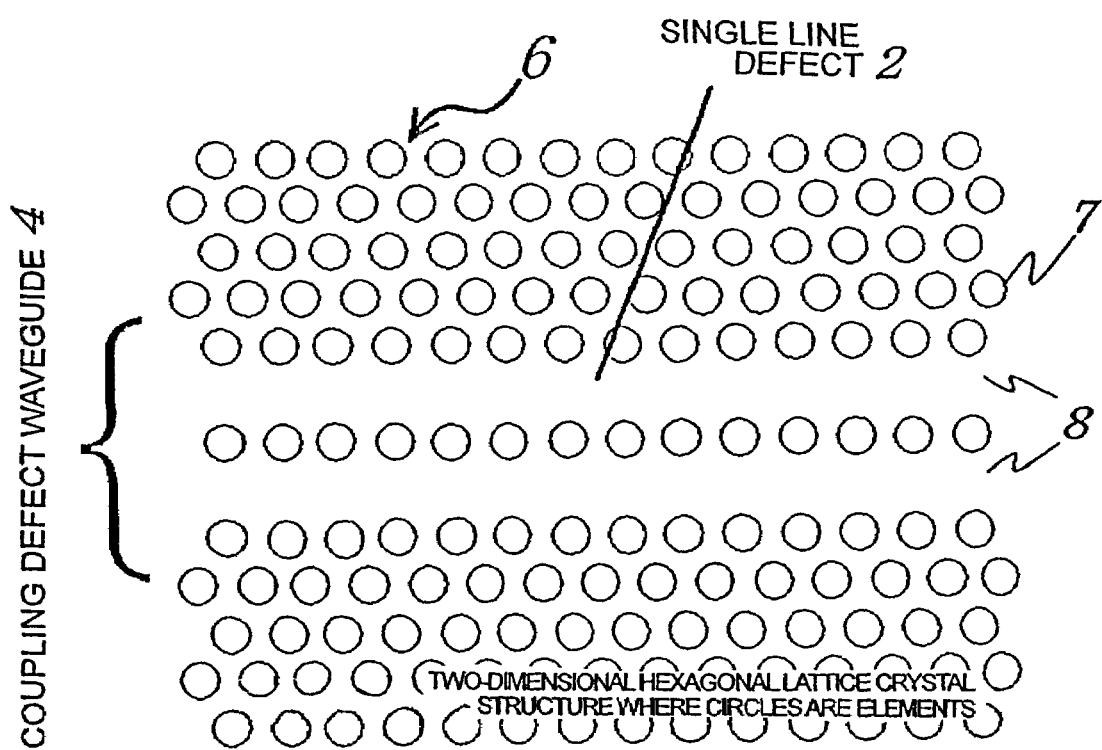
FIG. 13 is a schematic view showing a coupling defect waveguide formed on a two-dimensional photonic crystal.

FIG. 13 is a schematic view of a photonic crystal coupling defect waveguide made of two single line defects on a two-dimensional hexagonal lattice crystal structure which includes circles as elements. In this example, the single line defects are arranged to be spaced from each other by one line of photonic crystal elements, and a coupling defect waveguide is provided, however, no limitation is made to this, and they may be arranged to be separated by plural lines. Besides, the line defect may be a line defect having a bend or may be stair-like.

The photonic crystal coupling waveguide of this embodiment includes a photonic crystal 6 having photonic crystal elements 7, line defects 2 to form waveguides, and a coupling defect waveguide 4 having an input end or an output end 8. Besides, the coupling defect waveguide 4 is composed of at least two waveguides.

The photonic crystal 6 includes the photonic crystal elements 7 constituting a periodic structure, and suppresses the propagation of an electromagnetic field including light or radio wave of a specific wavelength or frequency range. The line defect 2 is such that defects as portions where the photonic crystal elements 7 constituting the periodic structure of the photonic crystal 6 are locally removed like a line in the photonic crystal and the waveguide is formed. The input end or the output end 8 is for inputting and/or outputting the electromagnetic field.

3. Photonic Crystal Device of a Coupling Defect Waveguide in Photonic Crystal

In the photonic crystal, since plural continuous or intermittent or single defect structure can be formed within one range, for example, two defect waveguides are arranged to be spaced from each other by a suitable distance, and when an electromagnetic field including light is incident on one waveguide, coupling occurs between those waveguides, and an electromagnetic field is induced in the other waveguide.

Figure 14:
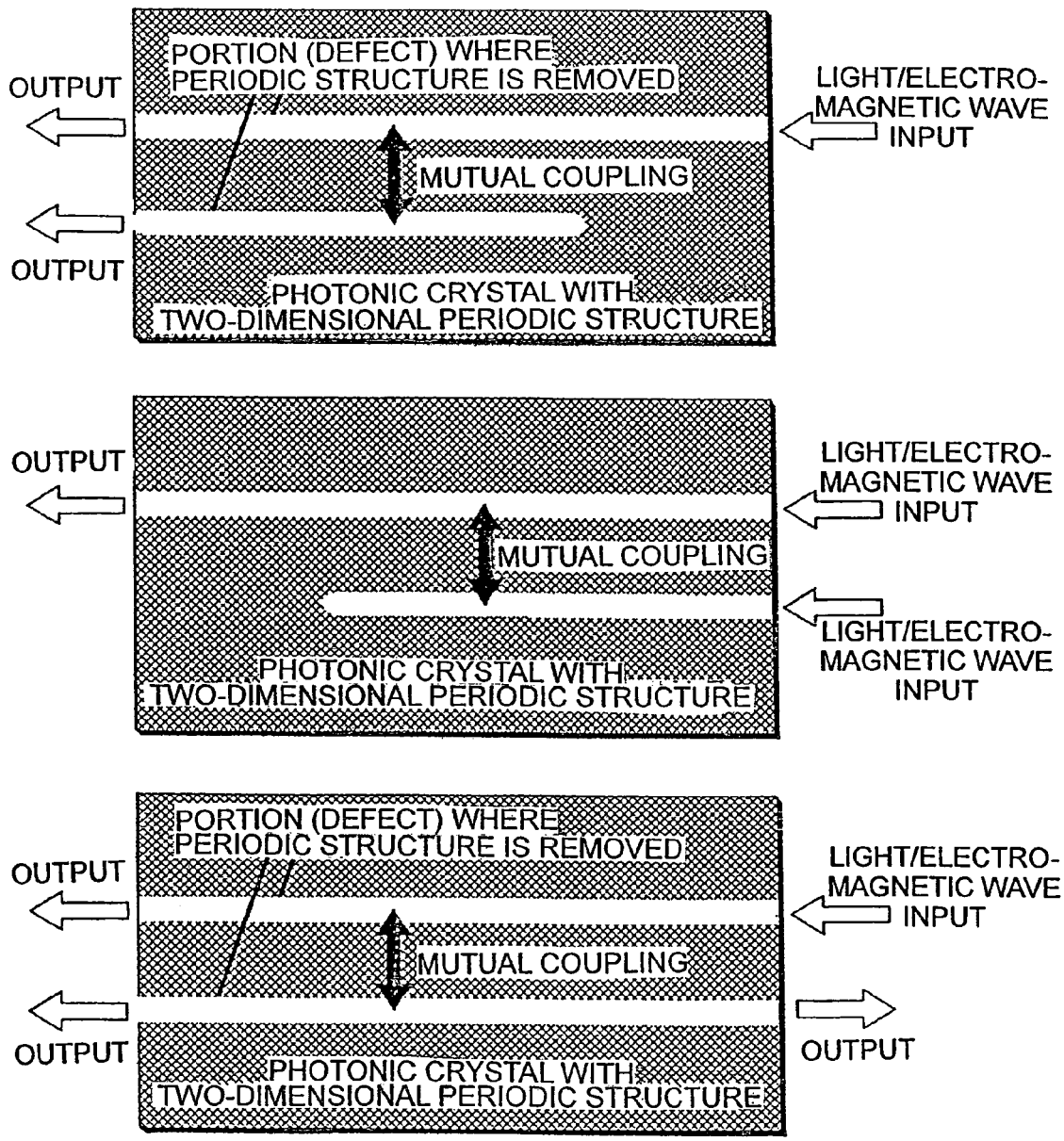
FIG. 14 is a schematic view showing a directional coupler using a coupling defect waveguide formed on a photonic crystal.

FIG. 14 is a structural view of a general example of a divider/branching unit, a coupler, and a directional coupler. This device uses a coupling defect waveguide with two line defects formed on the photonic crystal with the two-dimensional periodic structure. By using this phenomenon, the divider/branching unit is such that outputs from two or more places are obtained from input of an electromagnetic field at one place (upper row of FIG. 14), the coupler is such that an output is obtained from one place even if input is made from any of two or more places (middle row of FIG. 14), and the directional coupler has both the structures (lower row of FIG. 14). Incidentally, even if only the function of the coupler or the divider/branching unit is provided, the name of the directional coupler is sometimes used. In addition, by using the photonic crystal coupling defect waveguide, various photonic crystal defect devices such as a multiplexing unit and a demultiplexer can be formed.

Figure 15:
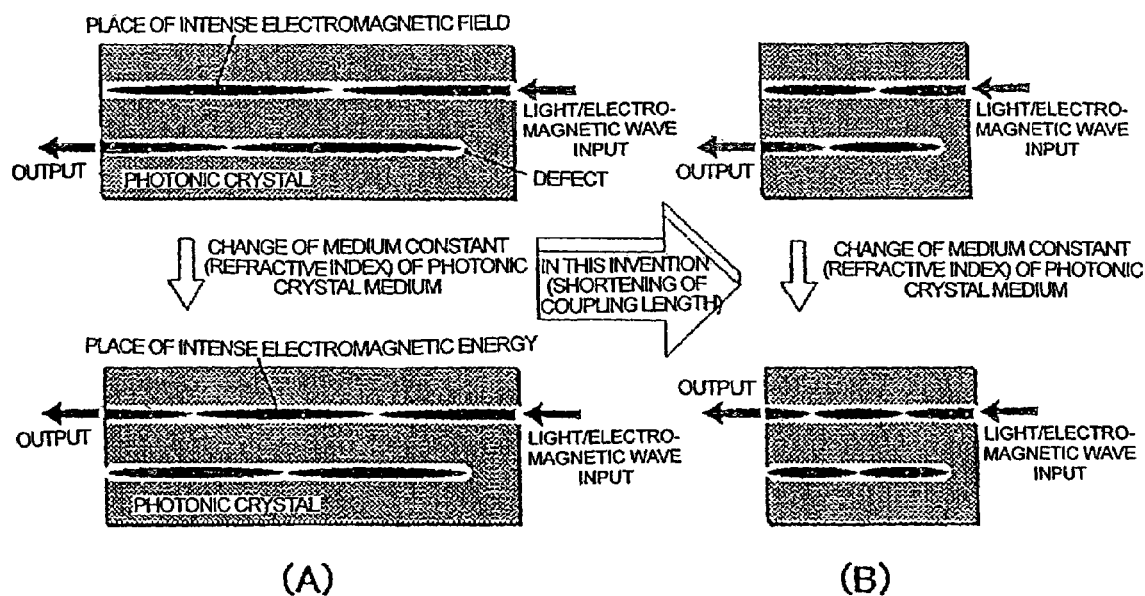
FIG. 15 is a schematic view showing the operation principle of a switch device using a directional coupler of a photonic crystal coupling defect waveguide and a state in which the switch device is made small by shortening the coupling length.

FIG. 15 is a schematic view showing the operation principle of a switch device using a directional coupler based on a photonic crystal coupling defect waveguide.

FIG. 15(A) is a schematic view showing the operation principle of the switch device using the directional coupler based on the photonic crystal coupling defect waveguide, and FIG. 15(B) shows the state in which the size of a similar switch device is decreased by shortening the coupling length based on this embodiment. Incidentally, the shortening of the coupling length in this embodiment will be described later.

When the medium constant of the photonic crystal is changed, the coupling length is temporally changed, and accordingly, the output position is also changed at the same time. In general, as a physical phenomenon used to cause a change in the medium constant (refractive index) of a medium used for an optical propagation path, the Pockels effect (primary electrooptic effect) and the Kerr effect (secondary electrooptic effect) are famous. Besides, a specific example of medium constant control by DC current from outside or electromagnetic wave/light signal will be described below.

First, a method of applying an external electric field or magnetic field is mentioned. Voltage application by an electrode added to the photonic crystal or the current injection corresponds to this. It is effective in the case where the medium forming the coupling waveguide is, for example, GaAs.

Next, as one example, a nonlinear medium region is realized by embedding quantum dots or doping a kind of ion into the periphery of a defect and a part or whole of the inside. This controls the propagation of light/electromagnetic wave and the degree of coupling by interposing a region in which the effective dielectric constant, conductivity (equivalent to a case where the effective conductivity is negative in the case where an amplification effect is seen in the region) of the nonlinear medium is made variable by a control signal or the like from outside. That is, when a portion that was a photonic crystal element (example: medium having the same dielectric constant as the air) a little while ago is suddenly changed into a defect (example: medium having the same dielectric constant as the semiconductor) by the external control, a passage is suddenly opened in the portion that was a wall which light/electromagnetic wave could not penetrate a little while ago, and the propagation direction of the electromagnetic wave can be controlled as desired (for example, see JP-A-2001-91912).

With respect to a method of causing a control signal from the outside to reach a nonlinear region, for example, the following are conceivable.

(1) A method in which a defect waveguide where a light/electromagnetic wave as a control signal is propagated to reach the medium is provided in the same photonic crystal differently from an already created defect waveguide where a processing object light/electromagnetic wave is propagated.

(2) A method in which in a defect waveguide that has been already created in a photonic crystal and a processing object light/electromagnetic wave is propagated, a light/electromagnetic wave signal with a frequency different from the light/electromagnetic wave is propagated and is made to reach the medium.

(3) A method in which a defect waveguide for control signal realized by a different two-dimensional photonic crystal is laminated through a certain medium on a two-dimensional photonic crystal provided with a waveguide where a processing object electromagnetic wave is propagated, and both are enabled to be electromagnetically coupled to each other by, for example, removing the sandwiched medium only at the position of the medium (see JP-2001-242329).

Incidentally, even in the same nonlinear medium, with respect to ion doping, similarly to an optical fiber amplifier of erbium ion doping or the like, a desired ion such as an erbium ion may be doped in a defect portion of the photonic crystal and/or an element portion.

4. Photonic Crystal Coupling Waveguide for Shortening Coupling Length

In general, the coupling length of electromagnetic waves propagating in plural mode-coupled waveguides depends on the magnitude of a propagation constant (or wave number) along the waveguide direction of each mode constituting the mode coupling. When consideration is given to the coupling waveguide composed of two waveguides, it is regarded as a directional coupler in which an even mode and an odd mode of an electromagnetic wave propagating therein interfere with each other, and the coupling length at that time is in inverse proportion to the difference in propagation constant between the even mode and the odd mode (see, for example, "Katsunari Okamoto: Basis of optical waveguide, CORONA PUBLISHING CO., LTD.", Section 4 (mode coupling theory).

In such a case, an electric field or a magnetic field in a waveguide is expressed by the sum of an even mode and an odd mode. When an electric field E(z) is used as an example, $$E(z)=Ee\cdot\exp(-j\beta e\cdot z)+Eo\cdot\exp(-j\beta o\cdot z) \quad (2)$$

Where $\beta e$, $\beta o$: propagation constants of even and odd modes, z: distance in the propagation direction, Ee, Eo: electric field amplitudes of even mode and odd mode.

Figure 19:
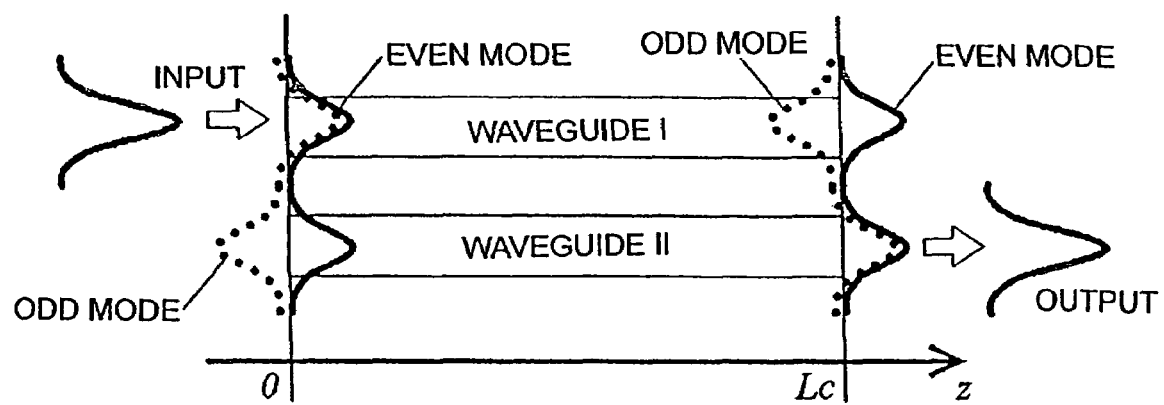
FIG. 19 is a schematic view of an electromagnetic field distribution in a direction perpendicular to the waveguide direction of each mode propagating in a coupling waveguide.

FIG. 19 is a schematic view of an electromagnetic field distribution in a direction perpendicular to the waveguide direction of each mode propagating in a coupling waveguide. An electromagnetic field is inputted from the left end (input end) of a waveguide I, and the sum of an even mode and an odd mode is outputted from the right end (output end) of a waveguide II. In this drawing, at the right end of the waveguide I and the left end of the waveguide II, the sum of the electric fields or magnetic fields of the even mode and the odd mode cancels out, and the electromagnetic field is not outputted.

Besides, at this time, a coupling length Lc is expressed by a following expression.

$$Lc=\pi/(\beta e-\beta o) \quad (3)$$

As in the above expression, the coupling length is a function (dependent) of a propagation constant (or wave number) along the waveguide direction of each mode (even, odd) constituting the mode coupling, and is specifically in inverse proportion to the difference in propagation constant between the even mode and the odd mode.

Incidentally, the expression (3) of the coupling length Lc relates to also the distance between waveguides. In general, as the distance between the waveguides becomes large, the coupling length requires a long distance. Accordingly, it is appropriate that both the waveguides are brought close to each other to the utmost. When the distance between the waveguides is changed, the structure of the coupling waveguide is also changed, and the propagation constant of the even or odd mode propagating over the two waveguides constituting the coupling waveguide is also changed. Accordingly, as indicated by the expression (3), the coupling length as the function of those is also changed.

Incidentally, the coupling length Lc can also be expressed as a function of a mode coupling constant indicating the degree of coupling of two waveguides as follows.

$$Lc=\pi/2\sqrt{(\chi^2+\delta^2)} \quad (4)$$

Where, $\chi$ denotes a mode coupling constant, and $\delta$ denotes a difference in propagation constant between modes propagating in respective waveguides in a case where the two waveguides constituting the coupling waveguide singly exist. This depends on a concept different from the interpretation that the mode coupling phenomenon is an interference of the even and odd modes propagating in the coupling waveguide. Besides, the modes here are not the foregoing even and odd modes, but the propagation modes in the respective waveguides in the case where the two waveguides constituting the coupling waveguide singly exist. Since it is reasonable that the mode coupling constant (degree of coupling) becomes small as the distance between the waveguides becomes large, from the expression (4), it can be said that as the distance between the waveguides becomes large, the coupling length becomes long. Also in the case where the number of the waveguides constituting the coupling waveguide is not two but three or more, basically, the same applies for every two waveguides, and there is a tendency that the coupling length of every two waveguides becomes short in the case where those waveguides are arranged to be close to each other as compared with the case where they are arranged to be remote from each other.

Accordingly, when the change to increase the difference in propagation constant between the respective modes is locally or wholly applied to the structure of the coupling waveguide, the coupling length can be shortened, and consequently, the sizes of various devices using such directional couplers can also be made small.

Incidentally, in the case where the number of the waveguides constituting the coupling waveguide is not two but three or more, a possibility that not only the even and odd modes, but also a higher-order mode occurs becomes high. However, the mode coupling phenomenon in that case can also be regarded as the interference of those modes, and the coupling length can be considered from the difference in propagation constant between those modes, and therefore, the same as the above applies basically.

FIG. 1 is a schematic view of a photonic crystal coupling defect waveguide and its band structure view. In FIG. 1, as an example, with respect to a photonic crystal coupling defect waveguide (upper row of FIG. 1) composed of two same photonic crystal single line defect waveguides formed on a two-dimensional photonic crystal slab, a band structure view, that is, a relation between a propagation constant (wave number) and a normalized frequency is shown. The photonic crystal coupling defect waveguide shown in the upper row of FIG. 1 is an example in which two lines of photonic crystal elements are arranged side by side between two coupled defect waveguides. The view of the coupling detect waveguide as a directional coupler is not an accurate one, but is a schematic view. Incidentally, design parameters of the photonic crystal structure are in accordance with, as an example, a document "A. Chutinan, et al.: Appl. Phys. Letters, Vol. 80, 2002, pp. 1698-1700".

At the left side of a light line at the center of the graph, an electromagnetic field leaks from the upper and lower parts of the slab. Besides, only a mode which exists in the photonic (crystal) band gap and appears to effectively function as a guided mode is indicated by a thick line. A line connecting the white circles in the drawing corresponds to the foregoing even mode, and a line connecting the black circles in the drawing corresponds to the odd mode. Incidentally, the inclination (differential coefficient) of a plot relating to each mode in such a band structure view expresses a group velocity (energy propagation speed) of the mode. As the inclination approaches a parallel with the horizontal axis, the propagation speed becomes low, and when the plot becomes completely horizontal, the propagation of light is stopped there.

The difference in propagation constant between the even mode and the odd mode at a certain regulated frequency influences on the coupling length. From FIG. 1, it is understood that the difference in the magnitude of the propagation constant between the modes in the waveguide direction becomes large as the normalized frequency is made small. Besides, when the difference in the propagation constant becomes large, the coupling length becomes small as indicated by the expression (3). For example, the difference in the propagation constant between both modes at the normalized frequency of about 0.274 is illustrated, as the normalized frequency approaches about 0.268, the difference in the propagation constant between both the modes becomes large, and the coupling length becomes small (see a thick arrow).

In order to decrease the normalized frequency, for example, following methods are conceivable.

a) An exciting frequency itself of an input signal is made low (wavelength is made long).

b) A periodic interval (lattice constant) of photonic crystal elements is made small. Incidentally, in this case, strictly, not only the lattice constant, but also the size of the photonic crystal element must be made small at the same rate to make the photonic crystal structure small in a similar manner. When only the lattice constant is made small and the size of the element is not changed, the effect (described later) of a effective change in medium constant due to the dense existence of the elements as compared with those before the alteration becomes dominant, and there is a possibility that a desired result can not be obtained.

c) The effective change (decrease) in the medium constant (effective refractive index) is used.

Figure 2:
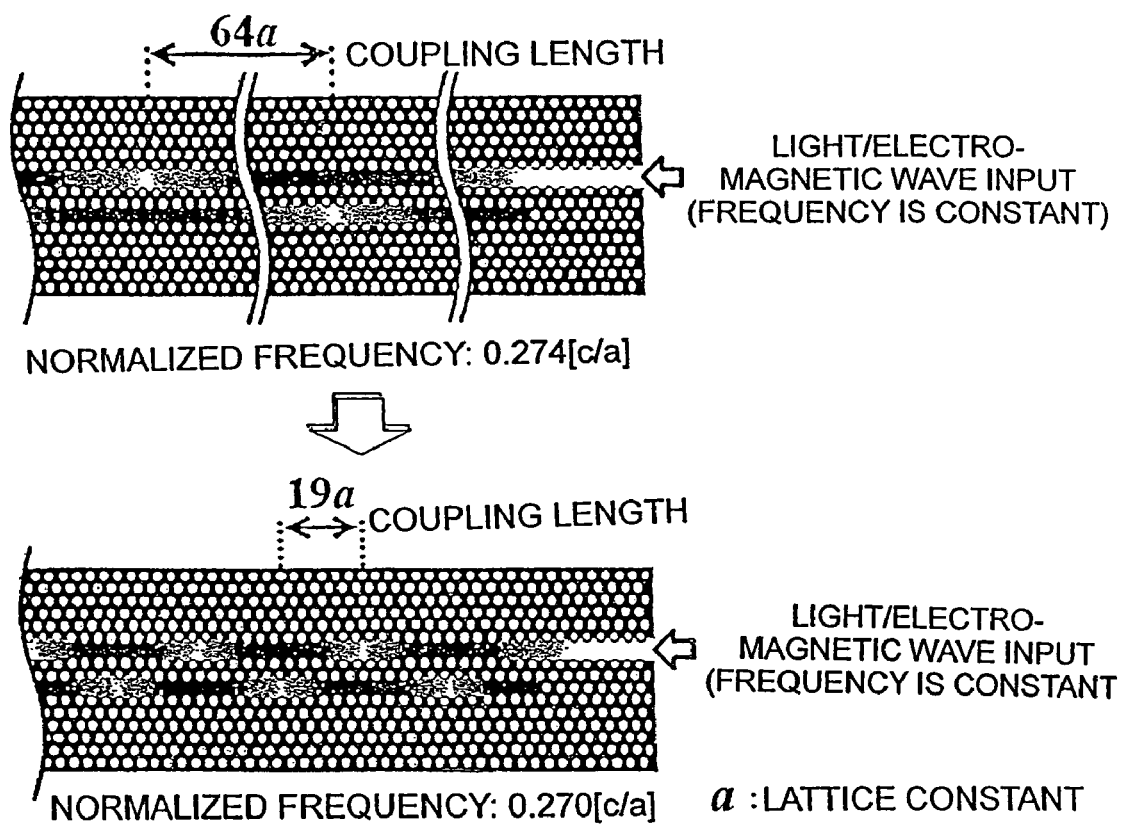
FIG. 2 is a schematic view showing the state of change in coupling length.

FIG. 2 is a schematic view of a state of a change in coupling length.

The upper row of FIG. 2 schematically shows the coupling length at the time when the normalized frequency is 0.274 [c/a]. In this example, the complete coupling length is 64a ("a" is the lattice constant). Besides, the lower row of FIG. 2 schematically shows the coupling length at the time when the normalized frequency is 0.270 [c/a]. In this example, the complete coupling length is 19a ("a" is the lattice constant), and the coupling length becomes shorter than that at the time of the normalized frequency of the upper row of FIG. 2.

Figure 3:
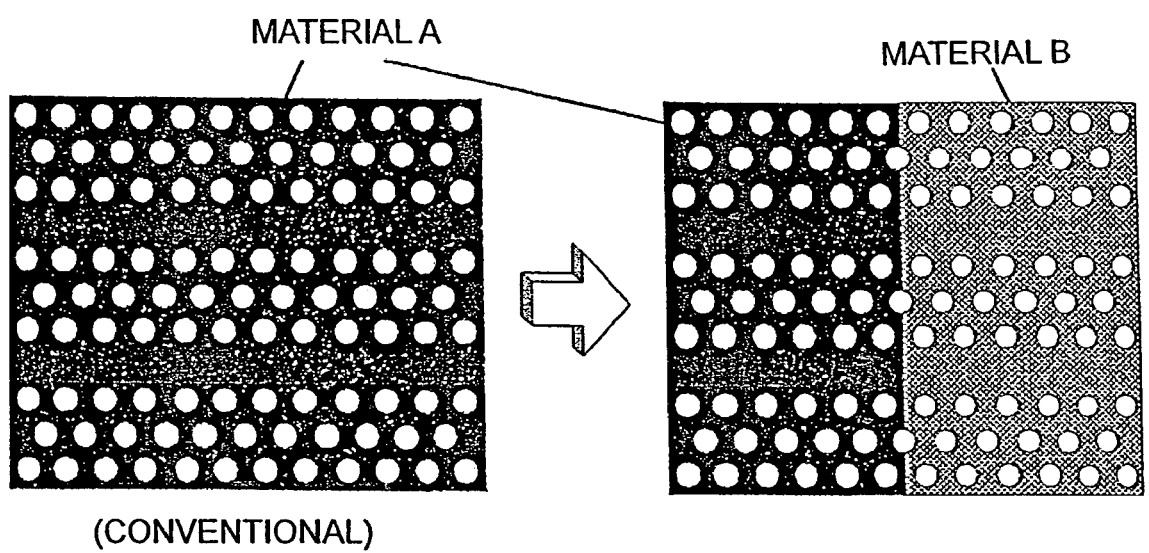
FIG. 3 is a schematic view showing a photonic crystal coupling defect waveguide in which a medium is altered in regions in order to shorten the coupling length.

FIG. 3 is a schematic view of a photonic crystal coupling defect waveguide in which the medium is altered in regions in order to shorten the coupling length.

One of photonic crystal coupling defect waveguides of the embodiment is such that in order to increase the difference in propagation constant between respective modes propagating in the coupling waveguide, as something to effectively change the normalized frequency, the medium constant, such as the dielectric constant, refractive index, conductivity or magnetic permeability, of a material constituting a photonic crystal is varied in a specified range including the defect waveguide of the photonic crystal, or a part or whole of the vicinity. For example, a material B different from a material A can be used for a part.

When the medium constant, especially the dielectric constant is changed, the band structure of the photonic crystal is changed relative to the normalized frequency, and that the medium constant varies in regions is almost equivalent to that the normalized frequency also varies when a region varies (see, for example, a document "J. D. Joannopoulos, R. D. Meade, J. N. Winn, translated by Fujii, Inoue: Photonic crystal—flow of light is confined to pattern—CORONA PUBLISHING CO., LTD.", Section 5.6).

Figure 4:
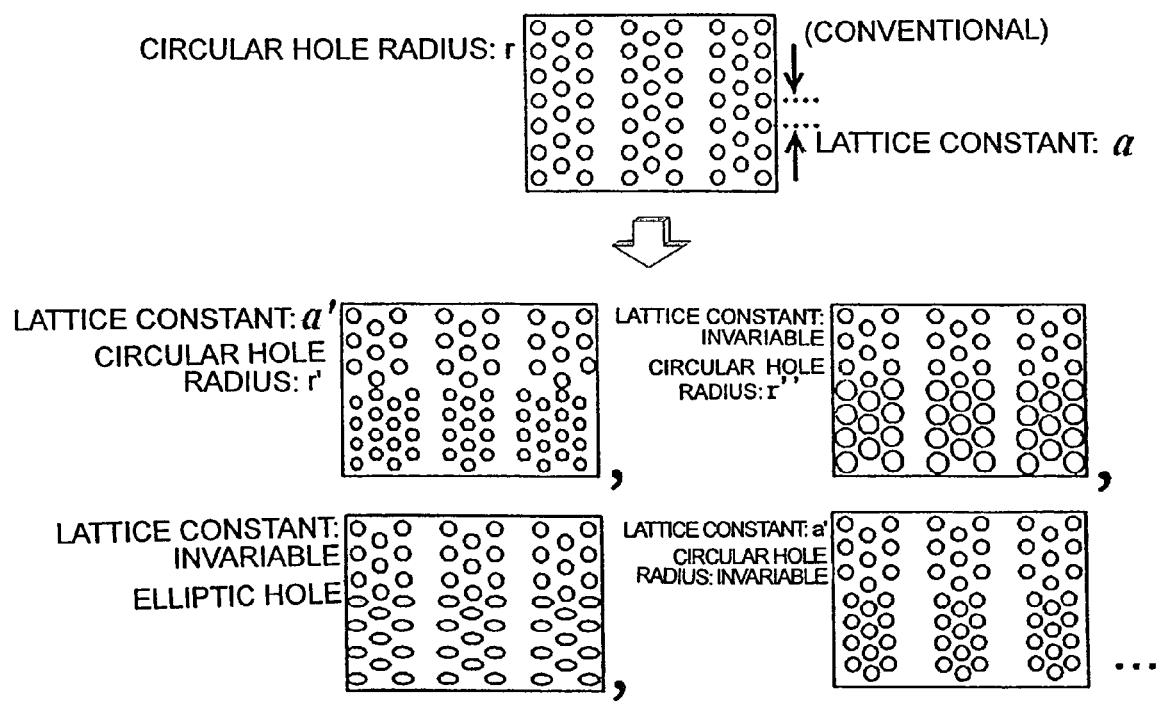
FIG. 4 is a schematic view showing a photonic crystal coupling defect waveguide in which the lattice constant, the sizes and shapes of photonic crystal elements are altered in regions in order to shorten the coupling length.

FIG. 4 is a schematic view of a photonic crystal coupling defect waveguide in which the lattice constant, sizes or shapes of photonic crystal elements are altered in regions in order to shorten the coupling length.

In one of the photonic crystal coupling defect waveguides of the embodiment, in order to increase the difference in propagation constant between respective modes propagating in the coupling waveguide, as something to effectively change the normalized frequency, one of or more than one of the periodic distribution interval of the photonic crystal elements, that is, the lattice constant, the sizes of the photonic crystal elements (defects) and the shapes thereof are varied in regions.

When the frequency of an inputted electromagnetic field is the same, the normalized frequency is in proportion to the lattice constant. In the foregoing expression (3), when the exciting frequency of the input signal is not changed, the wavelength is also not changed, and therefore, the normalized frequency Nf depends on only the lattice constant a. Accordingly, when only the lattice constant is made small, the normalized frequency Nf becomes low. In other words, when the wavelength of the input signal is not changed and the whole photonic crystal structure becomes small in a similar manner, this becomes equivalent to that the wavelength of the input signal is made large (frequency is made small) without changing the photonic crystal structure itself. By this, since the difference in propagation constant between the even mode and the odd mode becomes large, the coupling length becomes short.

Strictly speaking, when the shapes of the elements are not changed, and the sizes of the photonic crystal elements are also changed (for example, in the drawing, from circular hole radius r to r') at the same rate as the change (for example, in the drawing, from a to a') of the lattice constant of the photonic crystal elements, the change of the lattice constant becomes equivalent to the change of the normalized frequency (left middle row of FIG. 4). However, actually, even if only the lattice constant is changed, and the photonic crystal elements keep the same size (right lower row of FIG. 4), a similar effect can be obtained.

In the case where the photonic crystal elements are, for example, air circular holes, and have the dielectric constant (refractive index) smaller than that of the material of the photonic crystal such as the semiconductor, when an alteration is made such that only the lattice constant is changed and the circular hole radius is not changed, as compared with the case before the alteration, the rate (filling rate) of the circular holes occupying in the photonic crystal structure is increased, and therefore, the average refractive index of the whole photonic crystal becomes small. That is, since the circular holes do not become small, although incomplete, two of the foregoing "substantial reduction effectively in lattice constant" and "substantial reduction in average, that is, effective medium constant" occur at the same time. In this case, both has the effect to shift the band structure upward.

Besides, for example, only the shapes of the photonic crystal elements may be changed in regions (FIG. 4, the left lower row). For example, the shape of the photonic crystal element can be changed from a circular shape to an elliptic shape. Incidentally, the changed shape can be made a suitable shape.

Besides, only the sizes of the photonic crystal elements are changed, and the lattice constant may be made to remain unchanged (FIG. 4, the right middle row). This substantially changes the medium constant of the whole photonic crystal. Incidentally, the size of the photonic crystal element can be made suitable. The effect of the substantial change of the medium constant is used also in an example described next.

Figure 20:
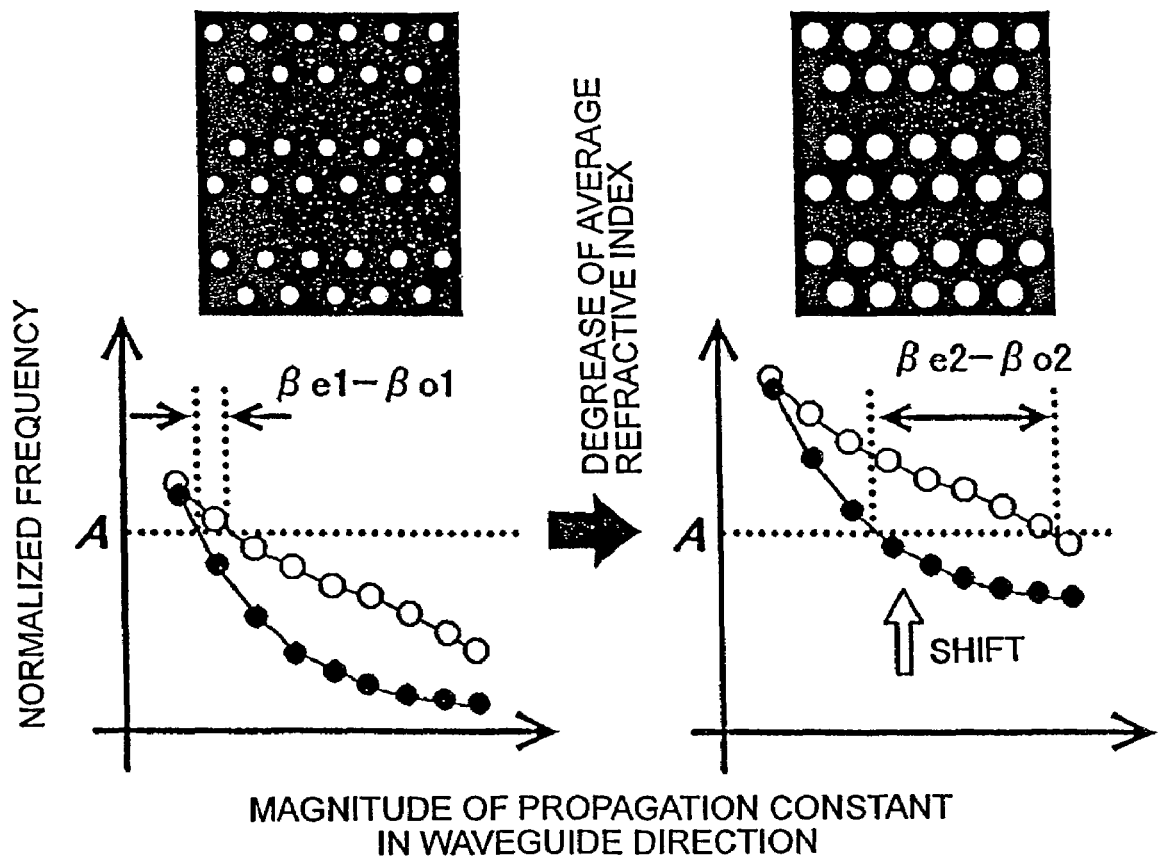
FIG. 20 is an explanatory view of a shift of a band structure in a frequency direction resulting from a effective change in refractive index of a medium.

FIG. 20 is an explanatory view of a change to the normalized frequency of the band structure resulting from the substantial refractive index change of the medium. For example, when the photonic crystal is realized as a structure in which air holes are periodically arranged in a certain material, when a part of the material is further removed by increasing the radiuses of the air holes, the (average) refractive index of the whole structure is decreased. As a result, the band structure is shifted in a positive direction with respect to the frequency as shown in the drawing. This is substantially equivalent to the lowering of the normalized frequency.

This is the same also in the case where a portion (vacancy) with a small refractive index is not increased but the shape of the vacancy is changed, or in the case where the refractive index itself of the material is changed to be small without changing the structure. When the medium constant or lattice constant is made small, the band structure is shifted upward with respect to the normalized frequency, and the effect is obtained that the normalized frequency is substantially decreased without changing the frequency (wavelength) of the input signal. On the other hand, when the medium constant or lattice constant is made large, the band structure is shifted downward.

By this, the difference in propagation constant between the even mode and the odd mode at the normalized frequency becomes large, and the coupling length becomes small.

Figure 5:
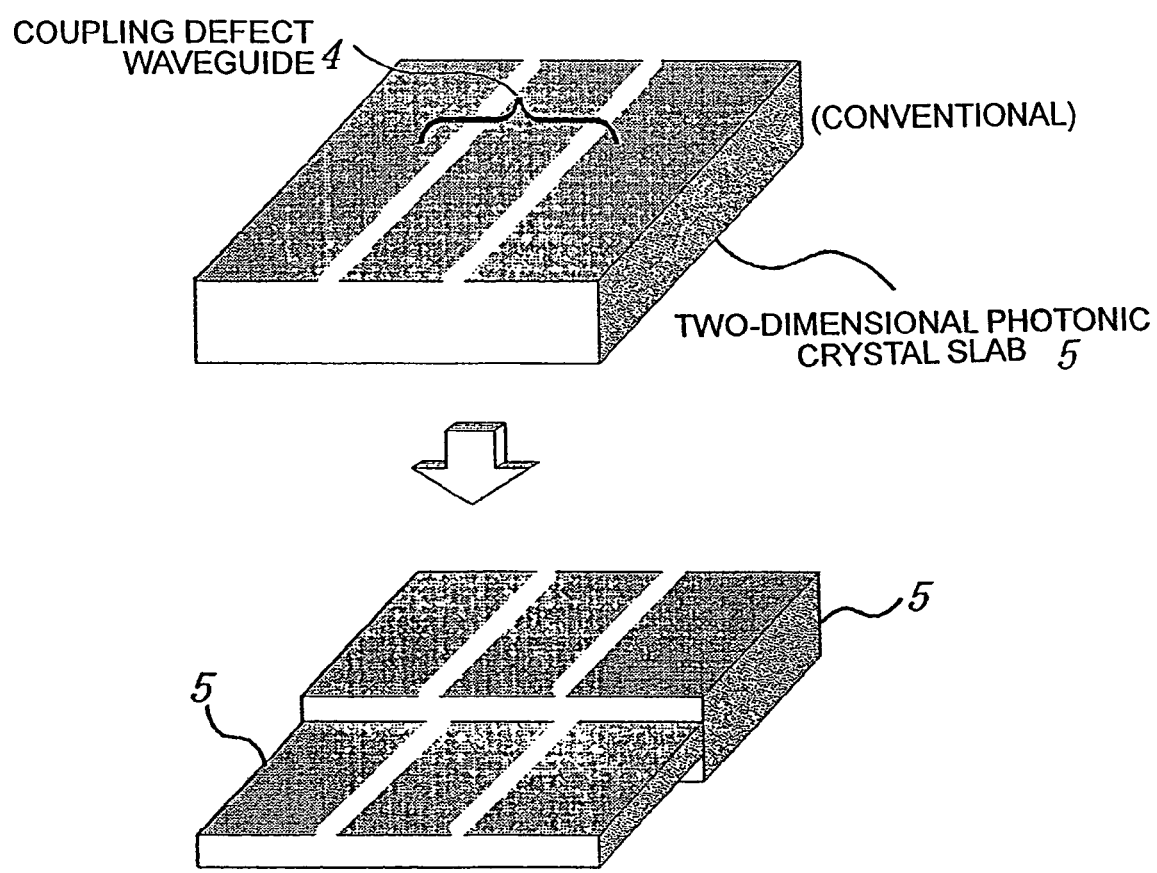
FIG. 5 is a schematic view showing a photonic crystal coupling defect waveguide on a two-dimensional photonic crystal slab in which the slab thickness is changed in regions in order to shorten the coupling length.

FIG. 5 is a schematic view showing a photonic crystal coupling defect waveguide with a two-dimensional photonic crystal slab shape in which the slab thickness is altered in regions in order to shorten the coupling length.

One of the photonic crystal coupling defect waveguides of the embodiment is such that in order to increase the difference in propagation constant between respective modes propagating in the coupling waveguide, as something to substantially change the normalized frequency, the equivalent refractive index is varied in regions. For example, the thickness of the slab is varied, so that the equivalent refractive index is changed.

The substantial medium constant of the waveguide medium for the electromagnetic wave propagating in the slab waveguide, especially the refractive index is changed according to the shape and thickness of the slab, and the equivalent refractive index derived in view of this becomes small as the slab thickness becomes thin (see, for example, "Kono, Kito: Basis of optical waveguide analysis, Gendai Kogakusha"). Accordingly, the photonic crystal in which the slab thickness is varied in regions is equivalent to that the medium constant (especially the refractive index) is varied in regions.

As means for lowering the average refractive index of the whole photonic crystal structure by further removing a part of the material, the vacancy is not made larger (hole is bored), but the slab is made thin. Although most of the electromagnetic field distribution of the electromagnetic wave propagating in the photonic crystal line defect waveguide is concentrated on the defect portion, some leaks to the portion beside the waveguide, where the photonic crystal elements are arranged. By this, the state is changed by changing the sizes and shapes of the elements. For the electromagnetic wave propagating in the waveguide, it is felt as if the substantial (average) refractive index of the structure is changed (change of the effective refractive index). In the case of the two-dimensional photonic crystal slab, the above circumstances can be applied also to the up and down direction, and when the slab thickness becomes thin, the effective refractive index becomes small likewise.

A relational expression of the slab thickness and the effective refractive index will be omitted (see, for example, "Basis of optical waveguide" Gendai Kogakusha). As described the above (for example, FIG. 20 and its description), that the medium constant is varied is almost equivalent to that the normalized frequency is varied.

Figure 6:
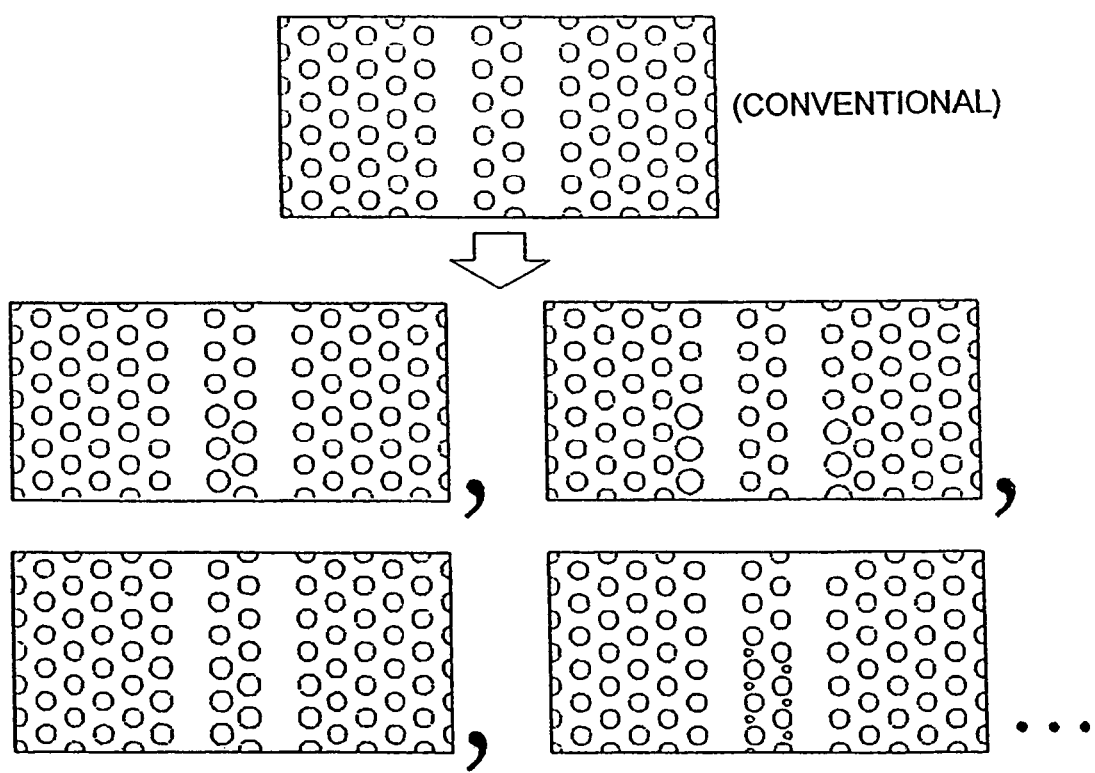
FIG. 6 is a schematic view showing a photonic crystal coupling defect waveguide in which a photonic crystal structure in the vicinity of a coupling waveguide is altered in regions in order to change the properties of respective modes propagating in the coupling waveguide at different rates.

FIG. 6 is a schematic view showing a photonic crystal coupling defect waveguide in which a photonic crystal structure in the vicinity of a coupling waveguide is altered in regions. In order to shorten the coupling length, properties (band structures) of respective modes propagating in the coupling waveguide are changed at different rates.

One of the photonic crystal coupling defect waveguides of the embodiment is such that in order to increase the difference in propagation constant between the respective modes propagating in the coupling waveguide, as something to change the propagation constants of the respective modes of the electromagnetic wave propagating in the coupling waveguide differently from each other, the periodic structure of the photonic crystal is changed in regions in the vicinity of the coupling defect waveguide. When the photonic crystal structure in the vicinity of the coupling defect waveguide is changed, the propagation constants of the respective modes of the electromagnetic wave propagating in the coupling waveguide are also changed. However, since the electromagnetic field distributions of the respective modes are not the same, it is expected that the influence of the change is also varied in the respective modes, the rates of the changes of the respective modes are not the same, and they can be changed so that the difference between the propagation constants becomes larger. Accordingly, when a region in which the photonic crystal structure is varied is provided in the vicinity of the coupling defect waveguide, the coupling length becomes smaller in the region than in the other region.

For example, the sizes of only the elements between the coupling defect waveguides are changed (FIG. 6, the left middle row), the sizes of elements adjacent to the outsides of the coupling defect waveguides or in a specified outside range are changed (FIG. 6, the right middle row), or these are combined (FIG. 6, the left lower row). Although the sizes of the elements are made large in FIG. 6, no limitation is made to this, and they may be made small. Incidentally, in addition to the sizes of the elements, as described above, the lattice constant, the shapes of the elements or the like may be changed. Besides, photonic crystal elements with different sizes or shapes are added (FIG. 6, the right lower row). When the elements are changed and/or the different elements are added, there is also an effect that the substantial medium constant of the structure becomes different.

Figure 7:
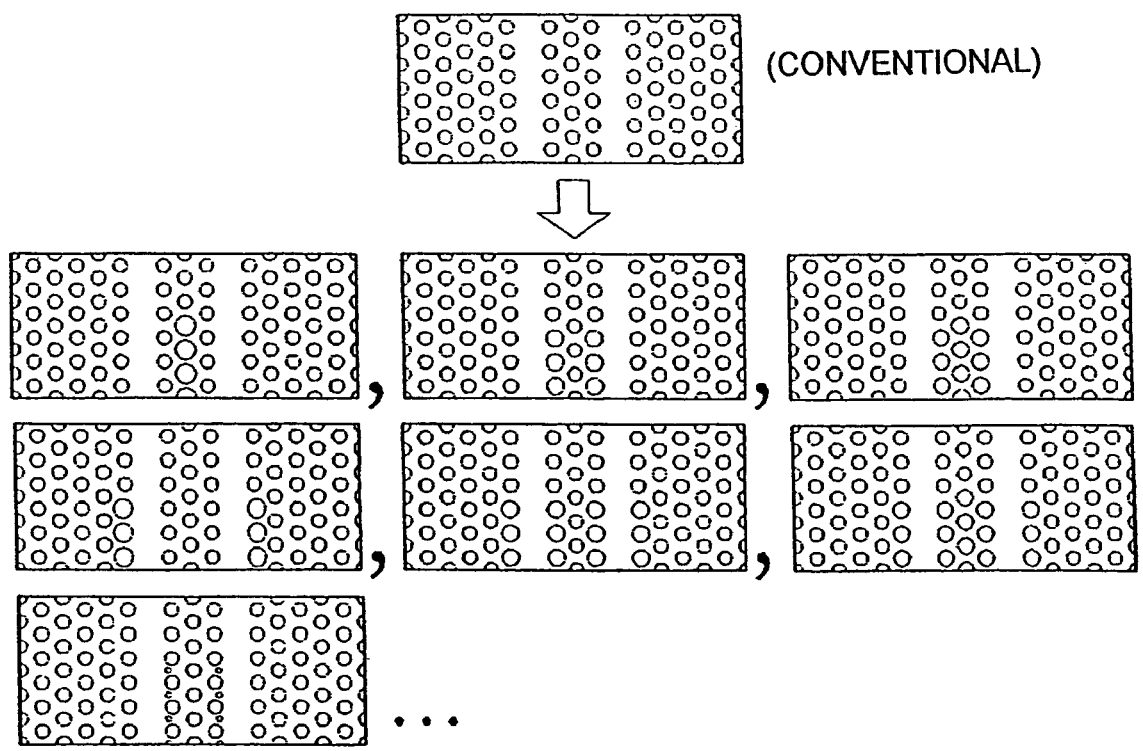
FIG. 7 is a schematic view showing another example of a photonic crystal coupling defect waveguide in which a photonic crystal structure in the vicinity of a coupling waveguide is altered in regions.

FIG. 7 shows another example of a photonic crystal coupling defect waveguide in which a photonic crystal structure in the vicinity of a coupling waveguide is altered in regions. FIG. 7 shows the example of the case where three or more photonic crystal elements exist between the coupling waveguides.

For example, in the upper left view of the second row of FIG. 7, the sizes of the elements in the vicinity (near the center in this example) between the coupling waveguides are changed. In the center view of the second row of FIG. 7, among elements between the coupling waveguides, the sizes of the elements adjacent to the waveguides are changed. Incidentally, in addition to the adjacent elements, the sizes of elements in a specified range may be changed. The right view of the second row of FIG. 7, the sizes of all elements between the coupling waveguides are changed.

Besides, in the left view of the third row of FIG. 7, among outside elements of the respective waveguides constituting the coupling waveguide, the sizes of the elements adjacent to the waveguide are changed. In the center view of the third row of FIG. 7, among outside elements of the respective waveguides constituting the coupling waveguide, the sizes of the elements adjacent to the waveguides are changed, and among elements between the coupling waveguides, the sizes of the elements adjacent to the waveguides are changed. In the right view of the third row of FIG. 7, among outside elements of the respective waveguides constituting the coupling waveguide, the sizes of the elements adjacent to the waveguides are changed, and the sizes of the elements between the coupling waveguides are changed.

Incidentally, in addition to the elements adjacent to the waveguide, the sizes of elements in a specified range may be changed. In FIG. 7, although the sizes of the elements are made large, no limitation is made to this, and they may be made small. Besides, in addition to the sizes of the elements, as described above, the lattice constant, the shapes of the elements or the like may be changed. In the left of the lower row of FIG. 7, photonic crystal elements of different sizes or shapes are added.

Figure 21:
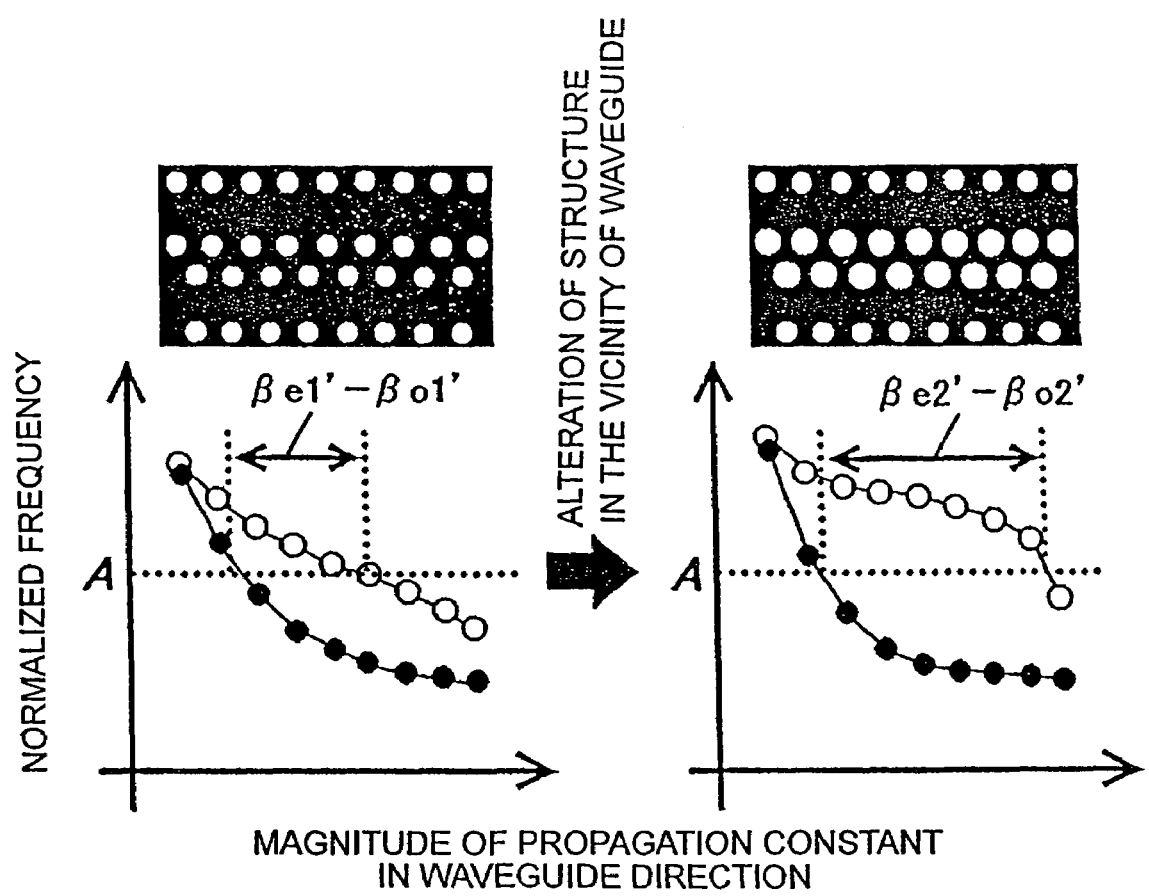
FIG. 21 is an explanatory view of a change of a band structure resulting from alteration of a photonic crystal structure in the vicinity of a waveguide.

FIG. 21 is an explanatory view of a change in band structure resulting from alteration of a photonic crystal structure in the vicinity of a waveguide. An example shown in FIG. 21 is intended to change the band structure itself. By changing the sizes of the photonic crystal elements in the vicinity of the waveguide (for example, between the waveguides), the band structure is changed, and the difference in propagation constant between the even mode and the odd mode at the normalized frequency becomes large. By this, the coupling length becomes small. Incidentally, in addition to the sizes of the elements between the waveguides, also in the case where for example, the sizes and/or shapes of the elements, or the lattice constant is changed in the range of FIGS. 6 and 7, the same applies.

Figure 8:
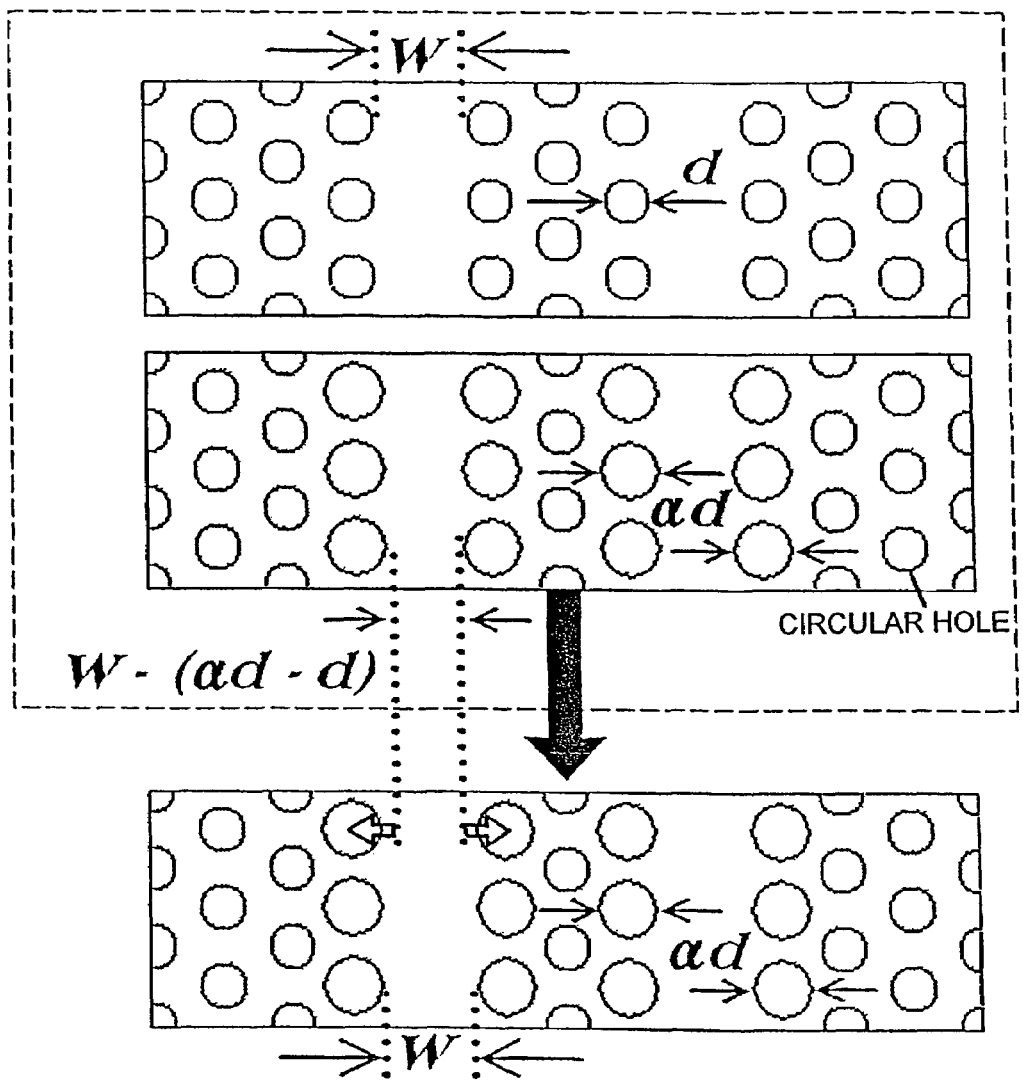
FIG. 8 is schematic view showing a state in which at a boundary of regions in which alteration has been performed so that the photonic crystal structures are different from each other in order to shorten the coupling length, alteration is further performed so that the widths of coupling waveguides become equal to each other.

FIG. 8 is a schematic view showing a state in which at a boundary of regions which have been altered so that the photonic crystal structures are different from each other in order to shorten the coupling length, an alteration is further made so that the widths of the coupling waveguides become equal to each other. The inside of a broken line of FIG. 8 corresponds to the photonic crystal coupling defect waveguides shown in FIG. 6 and FIG. 7. In one of the foregoing photonic crystal coupling defect waveguides, the photonic crystal coupling defect waveguide is such that in the case where the widths of the line defect waveguides are different or remarkably different from each other at the boundary of the regions, in order to make these almost equal to each other, the position (for example, the center position) and shape of the photonic crystal element is further changed. At the boundary of the regions where the photonic crystal structures are different from each other, since the widths of the defect waveguides are different, that causes the reflection of a propagated electromagnetic wave. The further alteration has an effect to prevent this.

Although most of the electromagnetic field distribution of the electromagnetic wave propagating in the photonic crystal coupling defect waveguide is concentrated on the defect portion, some leaks to a portion beside the waveguide, where the photonic crystal elements are arranged. Since the degree of the leakage generally varies according to the magnitude of the propagation constant of the mode, the degree of the leakage varies between the other side and this side of the boundary of the regions which are altered so that the photonic crystal structures are different from each other. The width of the waveguide may be adjusted by further changing the position (for example, the center position) and shape of the photonic crystal element, so that the ranges of the leakage become almost equal to each other. In this case, the width of the waveguide does not necessarily become constant at the boundary.

Since the magnitude of the propagation constant varies also between the even mode and the odd mode, at the boundary, there can occur a case where the plural waveguides constituting the coupling defect waveguide have respectively the degrees of leakage of the electromagnetic field distribution different from each other. In view of this case, the plural waveguides may be respectively adjusted so as to have the waveguide widths different from each other.

For example, as shown in FIG. 8, in the photonic crystal coupling defect waveguide in which the line defect waveguide has a width W and the photonic crystal element has a circular hole diameter d, in the case where the size of the element adjacent to the waveguide is increased by a factor of a without changing the center position of the element, the width of the line defect waveguide after the size of the element is changed becomes small by ($\alpha$d–d). Thus, when the center position of the element adjacent to the waveguide is moved by the reduced width in the direction of separating from the waveguide, the width of the line defect waveguide can be made to remain W and constant. Although this drawing shows the case ($\alpha$>1) in which the circular hole becomes large, also in the case where the circular hole becomes small ($\alpha$<1), the width of the line defect waveguide can be made to remain constant by changing the direction in which the center position of the element is moved. In FIG. 8, although the width of the line defect waveguide is made constant at the boundary of the regions, in view of the range of the leakage, no limitation is made to the constant width, and the center position of the element adjacent to the waveguide may be moved so that the width of the waveguide varies.

Figure 16:
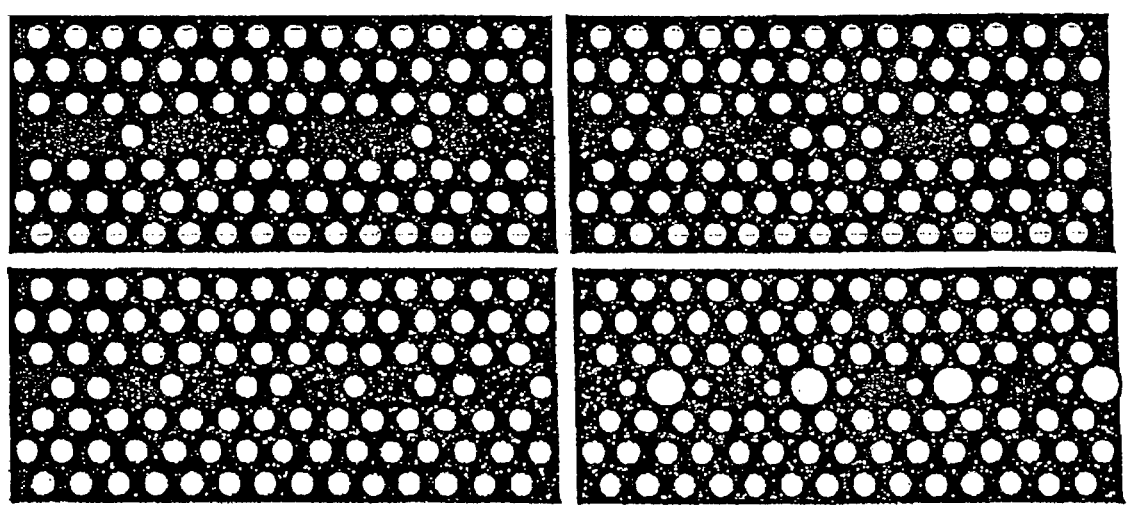
FIG. 16 is a schematic view showing an example of a discontinuous defect line mainly used to obtain a delay line effect.

FIG. 16 is an explanatory view of a discontinuous defect line. In the foregoing photonic crystal coupling defect waveguide, it may be made such a photonic crystal coupling defect waveguide including a discontinuous defect line that an intermittent point defect or line defect waveguide used for causing the delay of a group velocity of a propagated electromagnetic wave in the field of photonic crystal is adopted as a part of or whole of a line defect waveguide.

As shown in the drawing, the line defect may be formed by discretely arranging some defects spaced from each other by a certain distance. Since the waveguide made of the discontinuous defect line as stated above can delay the group velocity very much and has a delay line effect, it is expected to realize a smaller structure as compared with a simple line defect structure. Although FIG. 16 shows some examples of the waveguide made of the discontinuous defect line in the two-dimensional hexagonal lattice, no limitation is made to this. In this example, photonic crystal elements and the like are disposed in the region of a defect range (here, the case of a single line defect), and the defect line or point defect periodically exists.

Besides, in the foregoing photonic crystal coupling defect waveguide, it may be made such a photonic crystal coupling defect waveguide that the medium constant of a photonic crystal medium is changed by mainly a DC electric control signal from the outside, and the coupling length is temporally changed dependently on the intensity of the control signal. When the coupling length is changed, the place of the intense electromagnetic field is changed in the coupling waveguide, and therefore, by the adjustment of the coupling waveguide length, it is also possible to obtain the electromagnetic wave output from the waveguide which varies before and after the change of the coupling length. This is the operation principle of a directional coupler type switch device. This embodiment can be applied to a photonic crystal device.

In the foregoing photonic crystal coupling defect waveguide, it may be made such a photonic crystal coupling defect waveguide that the medium constant of a photonic crystal medium is changed by a light or electromagnetic wave control signal, and the coupling length is temporally changed dependently on the intensity and phase of the control signal. This can also be applied to a directional coupler type switch device.

Besides, the foregoing photonic crystal coupling defect waveguide may be made such a basic photonic crystal coupling defect waveguide that it is composed of two single line defect waveguides arranged in a two-dimensional photonic crystal slab at positions close to or adjacent to each other so that waveguide directions become parallel or almost parallel to each other.

Figure 17:
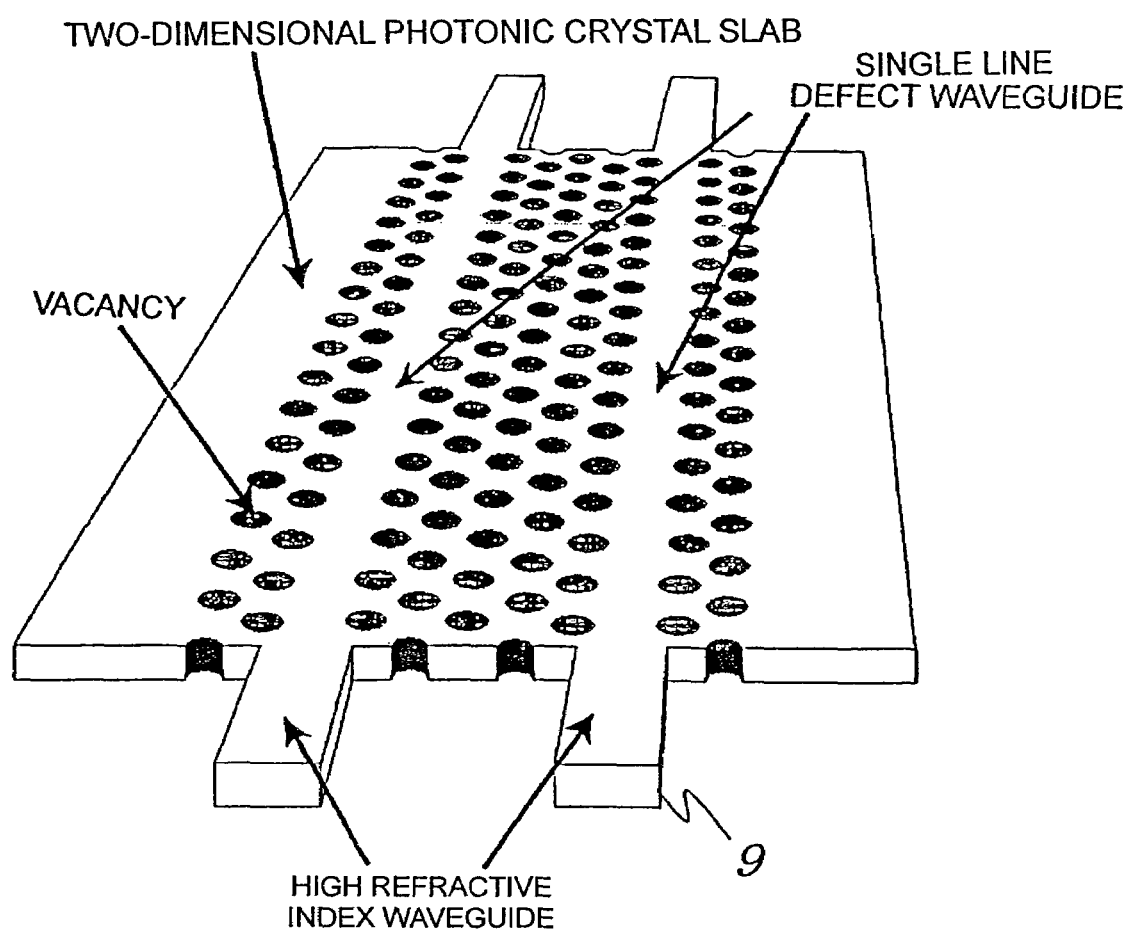
FIG. 17 is a view showing an example in which a high refractive index waveguide as an example of an input/output port is provided in a coupling waveguide formed on a two-dimensional photonic crystal slab.

FIG. 17 shows an example in which a two-dimensional photonic crystal is used as an example, and an input/output port 9 of a high refractive index difference waveguide is provided in a photonic crystal coupling defect waveguide as a directional coupler. Incidentally, the input/output port 9 may be constructed of a suitable waveguide or cable, such as a wave guide tube, a coaxial cable, an optical fiber, or a photonic crystal coupling defect waveguide, in addition to the high refractive index difference waveguide. The input/output port 9 can be provided at, for example, an input end or an output end 8.

The photonic crystal coupling defect waveguide shown in FIG. 17 is the photonic crystal coupling defect waveguide provided with a coupling portion to an external system, which includes an excitation source to cause an input signal and a receiver of an output signal through the photonic crystal coupling defect waveguide, in order to perform input/output for application as a device used for communication, measurement, arithmetic operation, or the like and as a transmission line of an electromagnetic field. As an example of the coupling portion, there is a direct connection to the same photonic crystal coupling defect waveguide or high refractive index difference waveguide, or a connection to an optical fiber by an end face coupling method. Besides, it also appears possible to perform coupling to a taper (tapered) fiber or connection to a polymer waveguide provided with a spot size conversion function (see, for example, "Osatomi: "SOI photonic crystal slab" Applied Physics, No. 72, No. 7, 2003, pp. 914-918").

Figure 22:
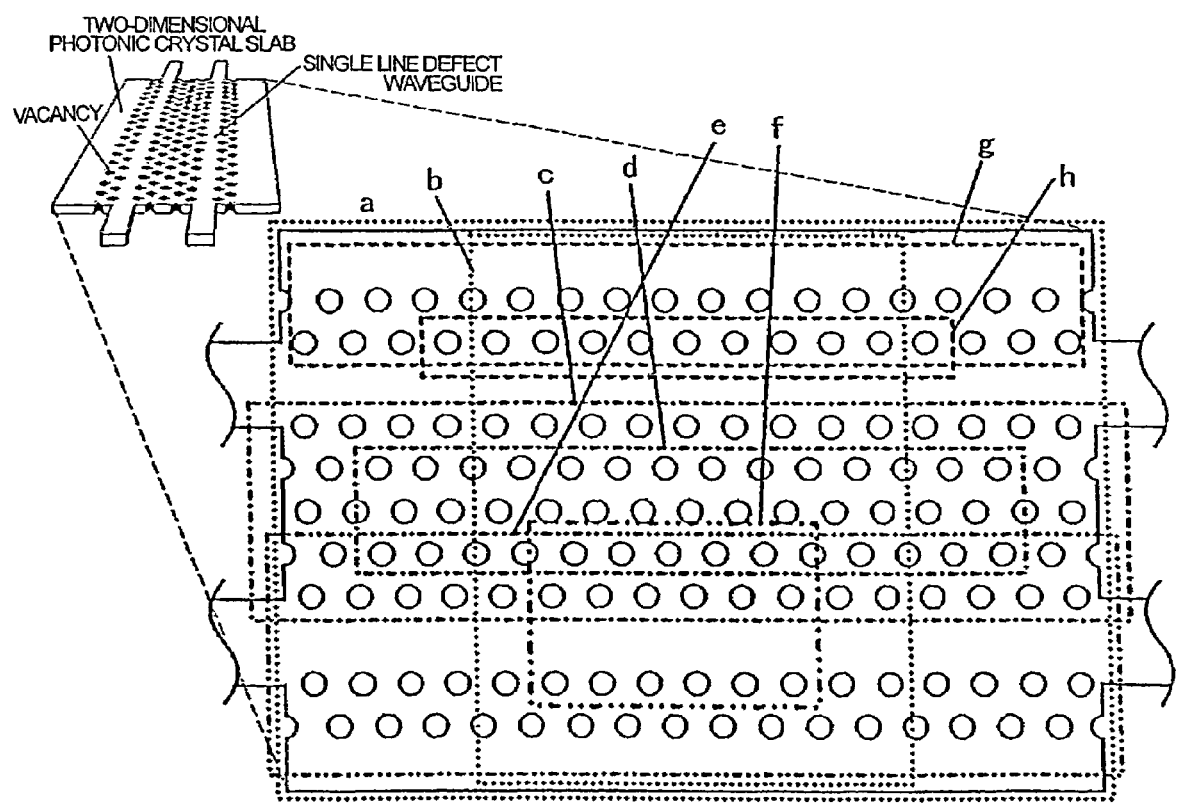
FIG. 22 is a view showing an example (1) of a region in which a photonic crystal structure is altered.

FIG. 22 is a view showing an example (1) of a region where a photonic crystal structure is altered. In the drawing, a to h denote examples showing ranges in which for example, a material, a lattice constant, a size or shape of an element, a thickness of a slab or the like is altered as described above.

In the drawing, a to h denote (a) the whole including the photonic crystal defect waveguide, b) a part including the photonic crystal defect waveguide, (c) the whole of the vicinity between waveguides, not including the photonic crystal defect waveguide, (d) a part of the vicinity between the waveguides, not including the photonic crystal defect waveguide, (e) the whole of the vicinity of the waveguide, including the photonic crystal defect waveguide, (f) a part of the vicinity of the waveguide, including the photonic crystal defect waveguide, (g) the whole of the vicinity beside (outside) the coupling waveguide, not including the photonic crystal defect waveguide, and (h) a part of the vicinity beside (outside) the coupling waveguide, not including the photonic crystal defect waveguide.

The photonic crystal coupling defect waveguide as shown in FIGS. 3 to 5 is intended to shift, for example, the band structure with respect to the normalized frequency, and this does not become effective unless the structure of the whole of the photonic crystal or a part including the waveguide is changed. Accordingly, the material, the lattice constant, the size or shape of the element, the thickness of the slab or the like is changed in the range a orb, and the photonic crystal structure is altered. Incidentally, the ranges of c-h of FIG. 22 may be adopted.

The photonic crystal coupling defect waveguide as shown in FIG. 6 and FIG. 7 is such that the band structures of the even mode and the odd mode are respectively change at different rates by altering, for example, the structure in the vicinity of the waveguide in which the electromagnetic field distribution of the propagated electromagnetic wave is concentrated, and consequently, the difference in propagation constant between both the modes in the waveguide direction is increased as compared with that before the alteration. Accordingly, the photonic crystal structure is altered in the ranges of c to h of FIG. 22. Incidentally, the range of a or b of FIG. 22 may be adopted.

Incidentally, actually, there can occur a case in which even if alteration is performed in the range e, f of the drawing, it can be regarded as a sufficiently wide region so that the intended effect to shift the band structure occurs. On the contrary, when alteration is performed in the ranges of c to h, there does not necessarily occur the intended effect to change the band structures of the even mode and the odd mode at different rates, and the intended effect to shift the band structure can occur.

Figure 23:
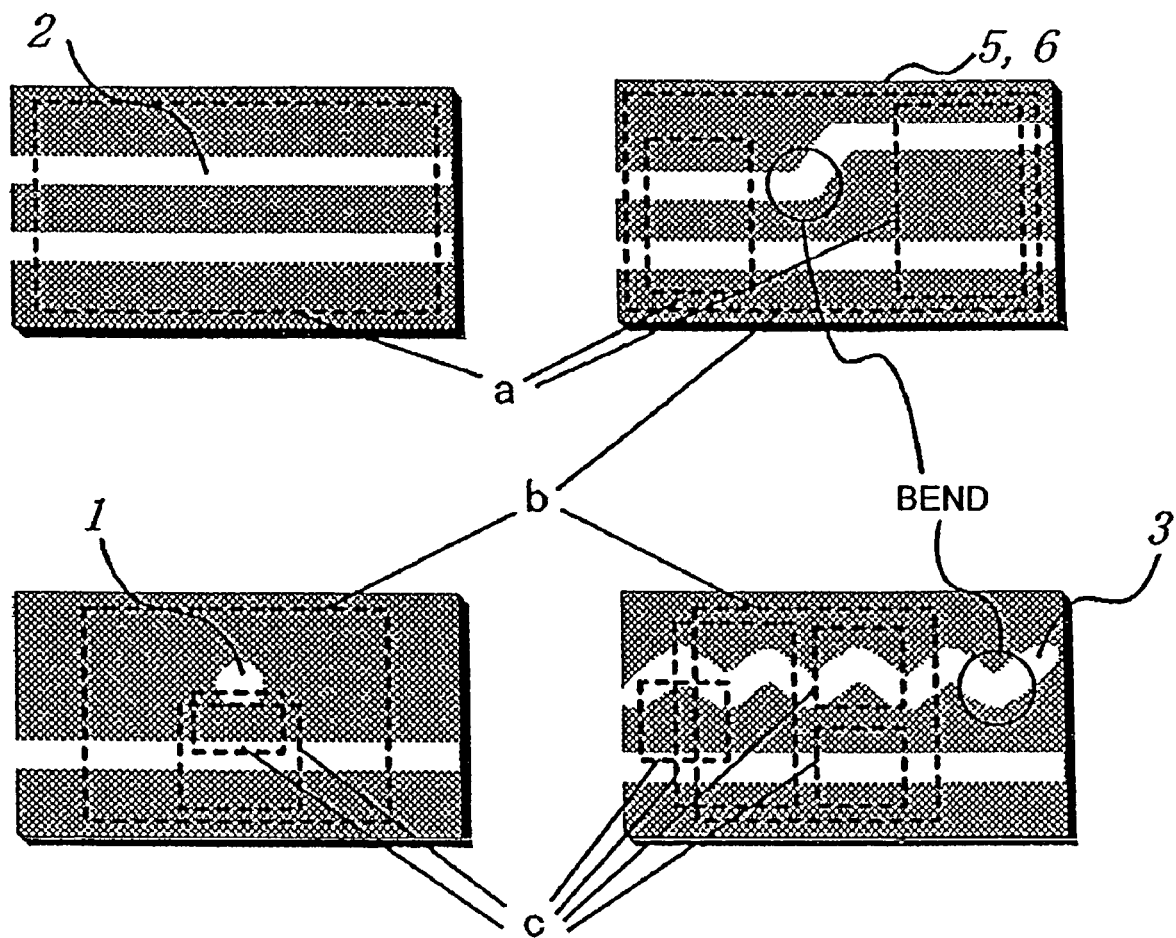
FIG. 23 is a view showing an example (2) of a region in which a photonic crystal structure is altered.

FIG. 23 is a view showing an example (2) of a region in which the photonic crystal structure is altered.

In the case of the step-shaped coupling waveguide, with respect to a part in which the waveguides constituting the coupling waveguide are parallel to each other, it is possible to select the region as shown in FIG. 22 (for example, a range a of FIG. 23). Besides, the photonic crystal coupling defect waveguide as shown in FIGS. 3 to 5 is a case in which the slab thickness is made thin over the whole region of the photonic crystal structure or the lattice constant is made uniformly short, and this can be carried out independently of the kind of the defect (for example, a range b of FIG. 23). Besides, in the case where the photonic crystal structure is locally altered as shown in FIGS. 6, 7, this can be carried out in, for example, the range in the vicinity of the waveguide (or defect) (for example, a range c of FIG. 23).

Besides, various devices including the foregoing photonic crystal coupling defect waveguide therein can be constructed. Any of the foregoing photonic crystal coupling defect waveguides can operate as directional couplers. The directional coupler is used as a basic element at the time when various devices such as a multiplexing combiner, a demultiplexer, a resonator, a filter, and a switch are realized. The multiplexing combiner is a coupler to combine plural signals in wavelength division multiplex as a transmission system in which plural different frequency signals are propagated in one waveguide, and the demultiplexer is a divider/branching unit and is also a filter.

5. Manufacture of Photonic Crystal Coupling Defect Waveguide

Figure 18:
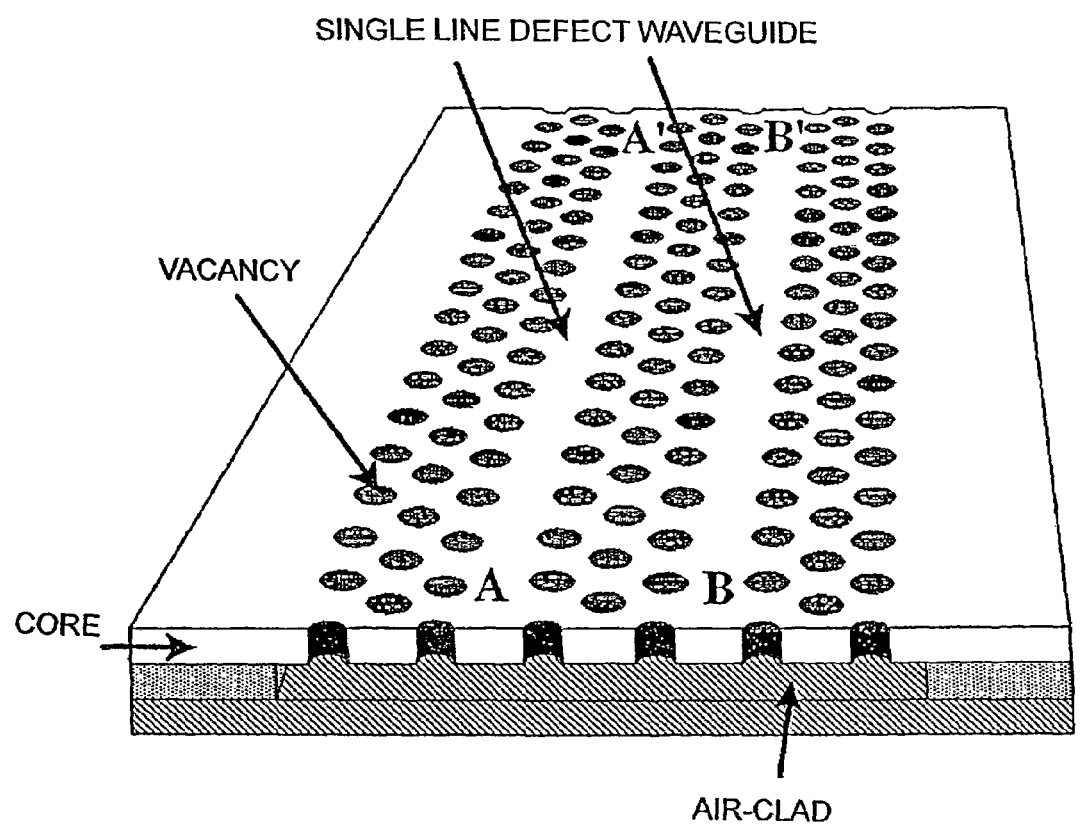
FIG. 18 shows a structural example of a photonic crystal coupling defect waveguide composed of two single line defect waveguides formed in an air-clad hexagonal lattice two-dimensional photonic crystal slab structure.

FIG. 18 shows a structural example of a photonic crystal coupling defect waveguide composed of two single line defect waveguides, which is formed in an air-clad two-dimensional photonic crystal slab as an example of an actual photonic crystal. Here, as an example, a hexagonal lattice crystal is mentioned as an example of a crystal structure.

First, a layer for selective etching and a layer as a core are formed on a medium as a base. Since the core part must be a material in which an electromagnetic field of a corresponding wavelength can propagate, for example, in the 1.55 μm band of optical communications, GaAs or the like is used. As the layer for selective etching, a material (AlGaAs or the like relative to GaAs) with a high selection ratio relative to the core is used. Although the photonic crystal is formed by providing periodic vacancies in the core part, a part thereof is arranged without forming the vacancies and defects are formed. The shapes, sizes, and arrangement of the vacancies or defects can be relatively freely designed by a method of micromachining in a general semiconductor process using an EB (electron beam exposure) technique, a dry etching or the like. Thereafter, the selective etching is performed through the vacancy, so that an air-clad region is provided in the lower part of the core. Besides, when the clad part is not made the air but is made a medium of refractive index lower than that of the core, a stronger device than that in the case of the air-clad can be realized. When a nonlinear medium part is partially used between two line defects, it is realized by locally forming InAs quantum dots or the like by selective growth. Here, a single line defect waveguide (A-A') and a waveguide (B-B') similar thereto are arranged to be close to and parallel to each other so as to realize coupling.

As a fabricating method of defects of a two-dimensional or three-dimensional photonic crystal, a suitable method can be adopted as disclosed in non-patent document 1. With respect to the method of fabricating the two-dimensional or three-dimensional defect structure in the photonic crystal, a suitable method can be adopted (see, for example, patent documents 5 to 9).

6. Modified Example of the Photonic Crystal Coupling Defect Waveguide

Incidentally, the foregoing photonic crystal coupling defect waveguide may have a structure that partial material in the slab plane locally varies, a structure that material of the slab in the thickness direction partially varies, or both the structures. For example, in a two-dimensional Ph-C (photonic crystal) slab, in addition to the case where the "in-plane" partial material locally varies, the material in the "thickness direction" of the slab may be made to partially vary (as an example, bonding of plates with different material is imaged).

Besides, in the photonic crystal coupling defect waveguide, portions of materials or medium constants different from each other may be connected to each other through a portion in which the material or medium constant is gradually changed or continuously changed.

Incidentally, in the photonic crystal coupling defect waveguide in which the slab thickness is made different from that of the other portion, the portion where the slab thickness is changed is equivalent to that the medium constant is "substantially" changed. That the slab becomes thin is equivalent to that for example, the shaved portion is replaced with the air, and the medium constant of the whole is attenuated (decreased) by that. Besides, especially, portions having different slab thicknesses may be connected to each other through a portion where the slab thickness is gradually changed or continuously changed.

Besides, a part of or whole of the periphery or inside of a defect of the photonic crystal further includes a nonlinear medium region realized by formation of quantum dots or doping of ions, and one of or more than one of the effective dielectric constant, conductivity and magnetic permeability of the medium may be made variable by applying an electromagnetic field including light or electromagnetic wave and/or an electric field and/or a magnetic field to the nonlinear medium region. As stated above, as one of means for changing the medium constant, for example, the quantum dot can be added. Besides, an external control signal can be made, for example, a steady (not changing temporally, direct-current) electric field or magnetic field, or a temporally changing electromagnetic field (so-called electromagnetic wave. Light is a kind of electromagnetic wave). The external control signal may be heat. For example, a region is further included which makes one of or more than one of the effective dielectric constant, conductivity and magnetic permeability of the photonic crystal variable by the heat applied from the outside, and the propagation constant of the electromagnetic wave and/or the degree of coupling may be made controllable. Examples are as follows.

EXAMPLE 1

When heat is applied to a polymer medium by a heater or laser irradiation, the medium constant is changed by the temperature change. A silica-based or polymer-based material is an example having a thermooptic effect.

EXAMPLE 2

When a DC electric field is applied to $LiNbO_3$ medium, the medium constant is changed. $LiNbO_3$ is one of typical media having the electrooptic effect.

EXAMPLE 3

When a DC electric field is applied to a structure made of plural compound semiconductors in which the compositions are changed and a current is injected, the medium constant is changed. For example, the compound semiconductor such as GaAs or InP is made to have a laminate structure while the composition is changed little by little, and when the DC electric field is applied vertically to the laminate surface, the medium constant of the structure is changed. This is based on, for example, a carrier effect.

EXAMPLE 4

When exciting light is made incident on the GaAs medium, the medium constant is changed.

EXAMPLE 5

When an optical pulse is made to flow through the GaAs medium including quantum dots, the average medium constant is changed.

Besides, in the foregoing photonic crystal coupling defect waveguide, the size of the photonic crystal element and the lattice constant can be changed at the same rate.

In the foregoing photonic crystal coupling defect waveguide, elements of sizes and/or shapes different from those of the photonic crystal elements are added to a part of the photonic crystal including a part of or whole of the coupling waveguide and it may be made different from the other portion.

In the foregoing photonic crystal coupling defect waveguide, and in the photonic crystal adjacent to or in the vicinity of the line defect of the coupling waveguide or the waveguide or between the waveguides, one of or more than one of the lattice constant, the sizes of the photonic crystal elements, and the shapes of the photonic crystal elements are made different from those of the other portion, and the width of the line defect or the waveguide may be locally changed.

In the foregoing photonic crystal coupling defect waveguide, and in the photonic crystal adjacent to or in the vicinity of the line defect of the coupling waveguide or the waveguide or between the waveguides, one of or more than one of the lattice constant, the sizes of the photonic crystal elements, and the shapes of the photonic crystal elements are made different from those of the other portion, and the positions of the photonic crystal elements can be locally shifted so that the width of the line defect or the waveguide is not changed or is hardly changed.

Besides, in the photonic crystal coupling defect waveguide, the thickness of the slab can be changed step-wise or stair-wise.

INDUSTRIAL APPLICABILITY

The invention can be applied to, for example, a device in which an electromagnetic field including light is used for communication, measurement, arithmetic operation or the like, and a general circuit realized by using a propagation line of an electromagnetic field.

The invention claimed is:

1. A photonic crystal coupling defect waveguide comprising:
    a photonic crystal including photonic crystal elements constituting a periodic structure and, for suppressing propagation of an electromagnetic field including light or a radio wave of a specific wavelength or in a specific frequency range; and
    a coupling waveguide including at least two waveguides, each of which includes a line defect that is a plurality of defects which are portions where the photonic crystal elements constituting the periodic structure of the photonic crystal are locally removed as line and forms the waveguide in the photonic crystal, and an input end or an output end for inputting and/or outputting the electromagnetic field and, which are mode-coupled to each other and, in which an electromagnetic field inputted to one of the waveguides causes an electromagnetic field to be propagated to the other waveguide,
    wherein
    by one of or more than one of (1) effectively changing a medium constant including one of or more than one of a dielectric constant, a refractive index, a conductivity and a magnetic permeability of the photonic crystal, (2) effectively changing size or shape of the photonic crystal elements, and (3) changing a lattice constant indicating a periodic interval of the photonic crystal elements,
    (a) band structures of an even mode and an odd mode of the coupling waveguide are shifted with respect to a normalized frequency, or (b) the band structures of the even mode and the odd mode of the coupling waveguide are respectively changed at different degrees;
    and by this, a difference in propagation constant between the even mode and the odd mode at a normalized frequency is made large, and a coupling length of a mode-coupled propagating electromagnetic wave which propagates in the coupling waveguide is made short, further wherein in the part of the photonic crystal including the part of or the whole of the coupling waveguide, the shape of the photonic crystal elements are not changed with respect to the another part, and the lattice constant and the size of the photonic crystal elements are changed similarly and at a same rate as compared with the another part.

* * * * *